US006993559B2

(12) United States Patent
Jilk, Jr. et al.

(10) Patent No.: US 6,993,559 B2
(45) Date of Patent: Jan. 31, 2006

(54) SYSTEM, METHOD, APPARATUS AND COMPUTER PROGRAM PRODUCT FOR OPERATING A WEB SITE BY ELECTRONIC MAIL

(75) Inventors: David J. Jilk, Jr., Superior, CO (US); Daniel A. Checkoway, Santa Ana, CA (US); Jonathan P. Hoffman, Covina, CA (US); Ralph A. Clark, Oakland, CA (US)

(73) Assignee: BigBow.com, Inc., Oakland, CA (US)

( * ) Notice: Subject to any disclaimer, the term of this patent is extended or adjusted under 35 U.S.C. 154(b) by 1070 days.

(21) Appl. No.: 09/780,044

(22) Filed: Feb. 9, 2001

(65) Prior Publication Data

US 2002/0010746 A1 Jan. 24, 2002

Related U.S. Application Data

(60) Provisional application No. 60/182,280, filed on Feb. 14, 2000.

(51) Int. Cl.
*G06F 15/16* (2006.01)
(52) U.S. Cl. .................... 709/206; 709/217; 709/219; 709/225; 709/246
(58) Field of Classification Search ............... 709/206, 709/207, 217, 219, 225, 246
See application file for complete search history.

(56) References Cited

U.S. PATENT DOCUMENTS

| | | | |
|---|---|---|---|
| 5,572,643 A | 11/1996 | Judson | 395/793 |
| 5,724,506 A | 3/1998 | Cleron et al. | 395/200.01 |
| 5,757,917 A | 5/1998 | Rose et al. | 380/25 |
| 5,793,497 A | 8/1998 | Funk | 358/402 |
| 5,826,241 A | 10/1998 | Stein et al. | 705/26 |
| 5,835,712 A | 11/1998 | DuFresne | 395/200.33 |
| 5,864,850 A | 1/1999 | Nordman | 707/10 |
| 5,870,549 A | 2/1999 | Bobo, II | |
| 5,901,286 A | 5/1999 | Danknick et al. | 395/200.33 |
| 5,918,013 A | 6/1999 | Mighdoll et al. | 395/200.47 |

(Continued)

OTHER PUBLICATIONS

Arthur Secret et al., The World Wide Web, Aug. 1994, vol. 37 No. 8 Communication Of the ACM. p. 76-82.*

(Continued)

*Primary Examiner*—Saleh Najjar
*Assistant Examiner*—Liang-che Wang
(74) *Attorney, Agent, or Firm*—Dov Rosenfeld Inventek

(57) ABSTRACT

Method, product, and apparatus of operating one or more Web pages by email. One embodiment of the method includes sending a first Web page to a first email address via a computer network as a first email message. The sent first Web page may include one or more of links or forms for further interaction, and is in a format consistent with an email environment such that the Web page is directly operable in an email browser of the environment. A user receiving the first email containing the first Web page may respond by operating the received first Web page, and this response may lead to a second email message that includes a URL request or form data being sent by the user to a second email address via the computer network. The method further includes retrieving the second email message, interpreting the URL request or form data of the retrieved second email message, retrieving a second Web page from a Web server connected to the computer network in accordance with the interpreted URL request or form data, and transcoding the retrieved second Web page from a Web browser format to a third format consistent with one or more properties of a second email environment.

78 Claims, 22 Drawing Sheets

U.S. PATENT DOCUMENTS

| | | | | |
|---|---|---|---|---|
| 5,925,103 | A | | 7/1999 | Magallanes et al. .......... 709/230 |
| 5,935,212 | A | | 8/1999 | Kalajan et al. ............... 709/228 |
| 5,937,160 | A | | 8/1999 | Davis et al. ............ 395/200.33 |
| 5,953,392 | A | | 9/1999 | Rhie et al. ................ 379/88.13 |
| 5,974,449 | A | | 10/1999 | Chang et al. ................ 709/206 |
| 5,978,836 | A | | 11/1999 | Ouchi ........................... 709/206 |
| 6,549,612 | B2 | * | 4/2003 | Gifford et al. ............... 379/67.1 |
| 6,564,383 | B1 | * | 5/2003 | Combs et al. ................ 725/136 |
| 2002/0007379 | A1 | * | 1/2002 | Wang et al. .................. 707/515 |
| 2002/0010746 | A1 | * | 1/2002 | Jilk et al. ..................... 709/206 |
| 2003/0061288 | A1 | * | 3/2003 | Brown et al. ................ 709/206 |

OTHER PUBLICATIONS

Accessing the Internet by Email FAQ. Aavilable online at http://www.fags.org/fags/internet-services/access-via-email/. Version 9.3, Dec. 18, 2000.

G_E_Boyd's How to Do Just About Anything by Email—Part 1. Available online at http://www.geocities.com/capitolhill/1236/howto1.html. Version Aug. 11, 2000.

"Web-to-Email: How to use email to surf the Web," Available at http://www.bellanet.org/email.html.

"Experienced User Manual for www4mail," *The Abdus Salam International Centre for Theoretical Physics*, Trieste, Italy. Manual available at http://www.ictp.triests.it/~www4mail/, Version 2.0 Dec., 1998.

"Quick Start Guide for www4mail," *The Abdus Salam International Centre for Theoretical Physics*, Trieste, Italy. Manual available at http://www.ictp.trieste,it/~www4mail/, Version 2.0 Dec., 1998.

* cited by examiner

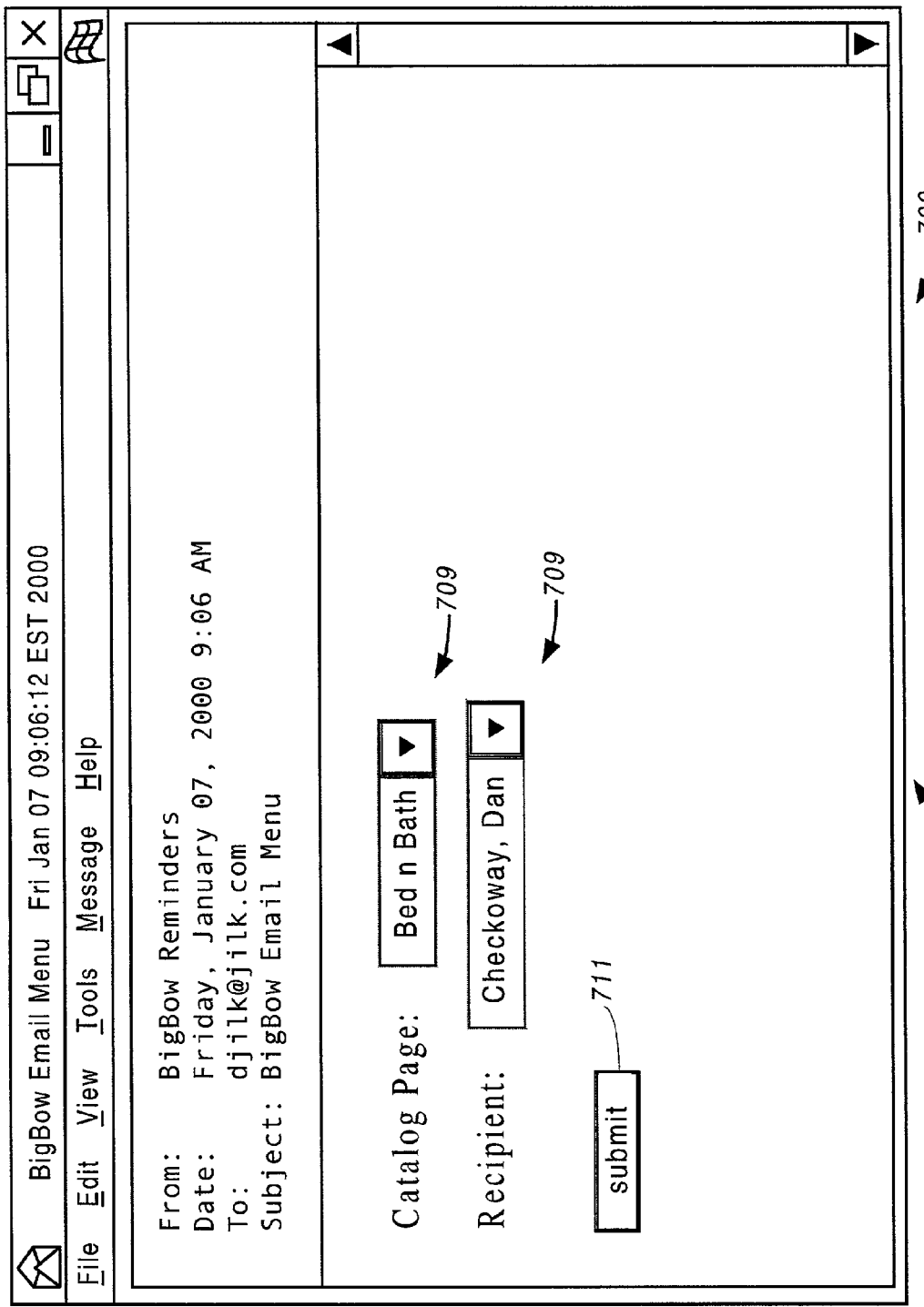

```
<HTML>
<HEAD>
<META content=text/html;charset=iso-8859-1 http-equiv=Content-Type>
</HEAD>
<BODY>
<FORM action=mailto:webmail@bigbow.com method=POST>
<INPUT type=hidden name=REQUEST_URL
       value="http://www.bigbow.com/catalog.asp">
<INPUT type=hidden name=REQUEST_METHOD value=POST>
<P>Catalog Page:
<SELECT name=catalog>
<OPTION value=1>Bed n Bath</OPTION>
<OPTION value=2>Traditions</OPTION>
</SELECT>
<P>Recipient:
<SELECT name=recipient>
<OPTION value=1>Checkoway, Dan</OPTION>
<OPTION value=2>Hoffman, Jon</OPTION>
</SELECT>
<P><INPUT name=submit type=submit value=submit>
</FORM></BODY></HTML>
```

EMAIL HTML SOURCE

FIG. 7B

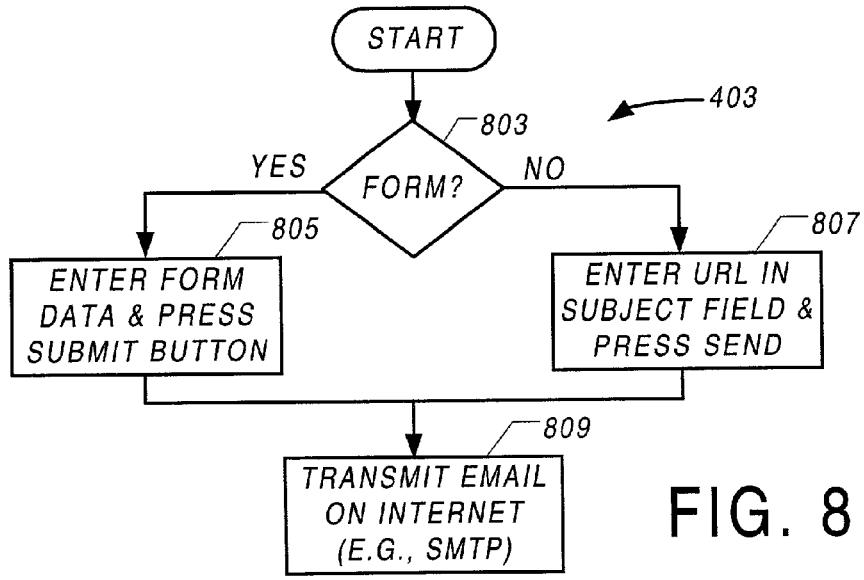

FIG. 8

```
                                    /—905        /—903
From: "Dan Checkoway" <dan@checkoway.com>
To: <webmail@bigbow.com>
Subject: Form posted from Microsoft Internet Explorer.
MIME-Version: 1.0     /—907
Content-Type: application/octet-stream;
      name="POSTDATA.ATT"
Content-Transfer-Encoding: quoted-printable
Content-Disposition: attachment;
      filename="POSTDATA.ATT"          —909
X-Mailer: Microsoft Outlook Express 5.00.2919.6600
X-MimeOLE: Produced By Microsoft MimeOLE V5.00.2919.6600
           ——917 /—911  /—913
ENQUEUE_URL=3Dhttp%3A%2F%2Fdev.bigbow.com%2Fscript%2Femail_repl=
y_process.asp&ENQUEUE_METHOD=3DPOST&email_reply=......
                                                         915 —/
                             :
—900                      FIG. 9
```

```
           INSERT INTO request_queue(
               request_id,———1203
               created_date,———1205
               completed_date,
               request_type_id,———1207
               request_status_id,———1209
               priority,———1211
               our_email,———1213
   1200       sendto_email,———1215
               url,———1217
               request_method,———1219
               post_content)
           VALUES(NULL, '[CurrentDateTime]', NULL,
           'incoming', 'open', 1,
           'Webmail@bigbow.com', '[SendTo]',
           '[URL]', [Method], '[Content]')
```

FIG. 12

```
         SELECT * FROM request_queue WHERE
  1400   request_status_id='open' AND
         completed_date is NULL ORDER BY
         priority, created_date
```

FIG. 14

```
                    ┌─1603
                    │  ┌─1605
                    │  │
       POST /test.cgi HTTP/1.1
       Accept: image/gif, image/x-xbitmap, image/jpeg, image/pjpeg,
              application/vnd.ms-excel, application/msword,
              application/vnd.ms-powerpoint, */*
       Accept-Language: en-us                          ┌─1609
       Content-Type: application/x-www-form-urlencoded
       Accept-Encoding: gzip, deflate              ┌─1611
       User-Agent: Mozilla/4.0 (compatible; MSIE 5.0; Windows 95; DigExt)
       Host: 127.0.0.1        ┌─1613
       Content-Length: 35              1617
       Connection: Keep-Alive
              └────────────1615 catalog=1&recipient=1&submit=submit ─────

```
                            ┌─1803
                           /   ┌─1805
                          / ┌─1807
                         / /  /
To: djilk@jilk.com
From: webmail@bigbow.com
Subject: BigBow
X-Courtesy-Of: BigBow Dequeue 1.0 (Built: Feb 13 2000 22:42:09)
Mime-Version: 1.0                                    ┌─1811
Content-Type: multipart/related; boundary="dequeue-boundary";
        type=text/html      └─1809

This is a multi-part message in MIME format.─────1813
                 ┌─1815
--dequeue-boundary       ┌─1817
Content-Type: text/html; charset=US-ASCII
Content-ID: <dequeue-body>              ┌─BODY CODE 1821
                            └─1819    /
<html><head><title>BigBow</title></head>
<body background="cid:http---www-bigbow-com-_borders-cap_top-jpg">
<a href="mailto:webmail@bigbow.com?subject=http://www.
        bigbow.com/index.htm>
<img src="cid:http---www-bigbow-com-images-header-jpg"></a>
<FORM ACTION="mailto:webmail@bigbow.com" METHOD="POST">
<INPUT TYPE="HIDDEN" NAME="REQUEST_URL"
        VALUE="http://www.bigbow.com/subscribe">
<INPUT TYPE="HIDDEN" NAME="REQUEST_METHOD" VALUE="POST">
<input type="hidden" name="listid" value="443">
Email Address
<input TYPE="TEXT" SIZE="32" MAXLENGTH="255" NAME="ATTR1" VALUE>
</form></body></html>
                        ┌─1823
--dequeue-boundary
 . . . . (Continued in FIG. 18B)

```
. . .(continuing from FIG. 18A last line " --dequeue-boundary")
Content-ID: <http---www-bigbow-com- borders-cap_top-jpg>
Content-Type: image/jpeg
Content-Transfer-Encoding: BASE64

R0lGODlheAAKALMAAA8PjRwckz8/pG5uup6e0czM5/b2+v///wAAAAAAAA
AAAAAAAAAAAAAAAAAAAAACwAAAAAeAAKAAAEVfDISau9O0vNu/9gKI5k+RWD
oK5s675wLM90XQ9FZgwB4P/AoHBILBqPyKTyFxgYKoSldEqtWouESfTK7Xq/
2UPvSy6bi4FD4cxum1HuuLw6mNvvyAgAOw==

--dequeue-boundary
Content-ID: <http---www-bigbow-com-images-header-jpg>
Content-Type: image/jpeg
Content-Transfer-Encoding: BASE64

R0lGODlhJgIxAMQAAA8PixcXuBsbzmNjuQoKEJiY0ezs9vPz+dPT2Pn5/0fn
6aWlpv////39/fn5+fPz8wAAAAAAAAAAAAAAAAAAAAAAAAAAAAAAAAAAAAAA
AAAAAAAAAAAAAAAAAAAAACwAAAAAJgIxAAAF/yAjjuQAnIAwrGzrvnAs
                         .
                         .
                         .
wWU7+9nQjnZ6sJmAWqx619jONq40YFjOJMAABjhAAh7XgAOYe9y2Tre6183u
drv73fCON6ntLO962/ve+M63vvfN72jQudv9DrjAB07wghv84LcAOMIXzvCG
0/zhEI+4xCd08Yp0Yb/0IYz7jGN87xjnv84yAPuchHTvKSm/zkKE85Lkqt8pa7
/0UWj7nMZ07zmjckBAA7

--dequeue-boundary--
```

FIG. 18B

```
                                              ┌─1917
                  ┌─1919       ┌─1903        /    ┌─1905
<html><head><title>BigBow</title></head>
<body background="http://www.bigbow.com/images/cap_top.jpg>
<a href="http://www.bigbow.com/index.htm">
<img src="http://www.bigbow.com/images/header.jpg"></a>
<form METHOD="POST" ACTION="http://www.bigbow.com/subscribe">
<input type="hidden" name="listid" value="443">
Email Address        └─1915                              └─1911
<input TYPE="TEXT" SIZE="32" MAXLENGTH="255"
       NAME="ATTR1" VALUE>
</form></body></html>
└─1900    └─1907
```

FIG. 19A

```
                                  ┌─1923
<html><head><title>BigBow</title></head>
<body background="cid:http---www-bigbow-com-_borders-
cap_top-jpg">─1933
<a href="mailto:webmail@bigbow.com?subject=http://     ┌─1925
www.bigbow.com/index.htm>─1931
<img src="cid:http---www-bigbow-com-images-header-jpg"></a>
<FORM ACTION="mailto:webmail@bigbow.com" METHOD="POST">
<INPUT TYPE="HIDDEN" NAME="REQUEST_URL"         ─1927
       VALUE="http://www.bigbow.com/subscribe">
<INPUT TYPE="HIDDEN" NAME="REQUEST_METHOD" VALUE="POST">
<input type="hidden" name="listid" value="443">
Email Address                                       └─1929
<input TYPE="TEXT" SIZE="32" MAXLENGTH="255" NAME="ATTR1"
VALUE>
</form></body></html>
└─1920
```

FIG. 19B

SYSTEM, METHOD, APPARATUS AND COMPUTER PROGRAM PRODUCT FOR OPERATING A WEB SITE BY ELECTRONIC MAIL

CROSS-REFERENCE TO RELATED APPLICATION

This application claims the benefit of U.S. Provisional Patent Application Ser. No.: 60/182,280 to Jilk, Jr., et. al., filed Feb. 14, 2000, entitled SYSTEM, METHOD, APPARATUS AND COMPUTER PROGRAM PRODUCT FOR OPERATING A WEB SITE BY ELECTRONIC MAIL U.S. Provisional Patent Application Ser. No. 60/182,280 is incorporated herein by reference.

FIELD OF THE INVENTION

The present invention pertains to data processing systems and client server computing, and more particularly to using electronic mail to operate Web servers that are normally accessed using hypertext transfer protocol (HTTP).

BACKGROUND OF THE INVENTION

The World Wide Web (the "Web", "WWW") and electronic mail ("email") are by far the two most popular uses of the Internet. The Web typically is navigated using a Web browser application, such as Netscape Navigator® (Netscape Communications Corporation, Mountain View, Calif.) or Internet Explorer® (Microsoft Corporation, Redmond, Washington). A Web browser typically accesses a Web site that includes a Web server. The Web server stores one or more Web pages or applications that perform an action such as generating a Web page, or both one or more pages and one or more Web applications. Operating a Web server refers to retrieving, displaying, and interacting with one or more Web pages that are normally stored in a Web server. A Web browser is usually used to operate a Web server.

Because of the popularity of the Web and of email, some systems have been invented and implemented that combine properties of both email browsers (e.g., email clients) and Web browsers. For example, email browsers implemented as Web applications and hosted on the WWW have become very popular. Many interactive Web sites transmit email messages upon the occurrence of certain events, such as user registration (a "welcome" message) or shipment of goods. Popular email browser software packages, including Outlook® and Outlook Express® (Microsoft Corporation, Redmond, Washington), and Netscape Messenger® (Netscape Communication Corporation, Mountain View, Calif.) have recently implemented the capability to display messages containing hypertext markup language (HTML) code within the email window, allowing email to contain the same rich formatting as the Web, including links to objects such as images that reside in remote Web servers.

Comprehensive systems have been implemented to read and send email using the Web, and the prior art includes systems that use email to assist with the maintenance of a Web site (see for example, U.S. Pat. Nos. 5,835,712 and 5,937,160).

Some systems have provided for operating a computer system through electronic mail. These systems require that the user type text into the body of a reply. The system then attempts to interpret the response. These systems are email-enabled client-server systems, but they do not relate to Web servers (e.g., HTTP servers).

There also have been attempts at operating Web sites other than through a traditional Web browser client, e.g., a telephone. See U.S. Pat. No. 5,953,392.

Systems also are known for retrieving and viewing Web pages using only email. Arthur Secret of the World Wide Web Consortium (http://www.w3.org) developer an email Web access system called an Agora server. Another system for accessing Web pages by email, GetWeb, was developed by SatelLife (Watertown, Mass., http://www.healthnet.org), an international not-for-profit organization employing satellite, telephone and radio networking technology to serve the health communication and information needs of countries in the developing world. The www4mail system (Adbus Salam International Centre for Theoretical Physics, Trieste, Italy, http://www.ictp.trieste.it/~www4mail) includes many of the functionality of the Agora and GetWeb systems. A user sends an email request to a web-by-mail server requesting a particular Web document and the document is returned via email in either text or HTML format. The returned HTML documents are formatted suitably for a text browser. The retrieved Web page is reformatted such that hyperlinks are replaced by a reference numeral or other designation in the main text. The URLs corresponding to the hyperlinks are then listed by reference numeral at the end of the email message containing the returned Web page. For example, if the paragraph included "World Wide Web Consortium" hyperlinked to http://www.w3.org, the Web page returned would be reformatted such that "World Wide Web Consortium" would be replaced by "World Wide Web Consortium [1]" and the returned Web page would have "[1] http://www.w3.org" appended at the end.

Most www4mail systems include all the capabilities of Agora and GetWeb servers. In addition, forms may be retrieved as email attachments to be viewed and filled in on Web browsers.

One prior-art implementation of an email-enabled Web site provides for email messages to be transmitted in response to operations performed by the user on the VWeb site (using a Web browser) or as triggered by calendar or scheduled events. These e mail messages usually contain "hyperlinks" that allow the user to open a Web browser window and visit the Web site with a single mouse operation. Further operations take place directly through the Web site in a Web browser. In the rare instances where HTML forms are transmitted to users and submitted, the system is coded to directly handle the results of the form as it comes in through email.

None of these systems provide for direct operability of a Web page in an email browser or for comprehensive user operation of a Web site using only email. Directly operable means that one or more of the links or form controls is directly and automatically operable as though it were in a Web browser but using email as the transport mechanism, for example by clicking on the link or control, rather than by requiring any cutting or pasting or other manual operations. In addition, these prior-art systems do not provide for mailbrowser environment-specific optimizations to transcode web pages into a format that is most appropriate or convenient to the viewer's email browser environment.

Such a capability would be useful because:
  Many users of the Internet spend most of their time disconnected; they download email in bulk, disconnect, and read and respond to messages while offline, and then connect at a later time to transmit their own messages. Such users would gain convenience from the ability to operate Web sites in a similar "mostly disconnected" fashion through email.

Many operations on Web sites require latency in that the user must look up information, consider options, and make decisions. However, the Web is awkward for returning to a partially completed task. By operating a Web site through email, Web tasks, represented by Web pages, can be retained in the email browser's "inbox" until the user is ready to complete the task.

Similarly, email is often used to notify customers or users of an event or decision. The ability to directly operate in the email browser, e.g., to respond directly with email rather than needing to link ("hyperlink") to a Web site is much more convenient, both because the user may be disconnected at the time of reading the email, but also because it does not require going to the separate "environment" of a Web browser application.

Complex workflow applications could be built to use standard Web and email interfaces simply by building an appropriate Web site and without developing special purpose code for delivery of messages and translation of forms.

SUMMARY

A feature of the present invention is therefore operating one or more Web servers (e.g., HTTP servers) with electronic mail as the primary user interface.

In one embodiment, the present invention provides a mechanism for dynamic HTTP-based server application to be directly operable by a user through email, without requiring the Web page author or application developer to include significant email-specific coding.

In another embodiment, the present invention provides a mechanism for a user to directly operate a Web page in an HTML-enabled email browser.

In another embodiment, the present invention provides a mechanism for a Web server to interact with a user who does not have a Web browser application.

Described herein is a method of operating one or more Web pages by email. A Web page refers to information that includes HTML or other encoding displayable in a Web browser. A Web page may be static, i.e., retrieved from storage at the Web server, or may be dynamic, e.g., generated dynamically by the web server in response to one or more stimuli. Furthermore, a static Web page may include JavaScript or other scripting. The method includes sending a first Web page to a first email address via a computer network. The first Web page, for example, may be sent as a first email message. By sending such a first Web page is meant, for example, sending a first email message, that includes form controls such as buttons that are operable in an email client. The sent first Web page may include one or more of links or forms for further interaction. A link, for example, may be a hyperlinks to a URL. A form may include one or more form controls such as buttons or pull down menus. These links and/or forms provide for the further interaction directly in an email environment.

The Web page is sent in a first format consistent with one or more properties of a first email environment such that the first Web page is directly operable in an email browser of the first email environment. As is commonly understood, an email environment includes 1) an emailer such as sendmail, an SMTP server, or some other mechanism for sending email, 2) one or more intermediate relay stations that may interpret and/or modify the email, e.g., to wrap words, or reformat the email, and 3) an email browser, also called email reader or email client, to read and display the email. Exemplary email browsers include Microsoft Outlook Express, Qualcomm Eudora, and other email clients. Directly operable means that one or more of the links or form controls is directly and automatically operable as though it were in a Web browser but using email as the transport mechanism, for example by clicking on the link or control, rather than by requiring any cutting or pasting or other manual operations.

In one embodiment, the first format assumes an unknown email environment. For example, MIME formats may be used, and the email browser of the first email environment may select the appropriate format it is able to display.

A user receiving the first email containing the first Web page may respond, which may generate a second email message. The method further includes retrieving the second email message that is a response to the user receiving and directly operating the first Web page. This second email message is sent to a second email address via the computer network and includes a URL request or form data.

In one embodiment, the method further includes transcoding an original Web page in a Web-browser format to the first format to generate the first Web page. A Web browser format is a format such that the Web page is directly operable in a Web browser.

In one embodiment of the method, the sending of the first Web page occurs when a calendar event, such as a date, or a time and date, occurs.

In one embodiment of the method, the sending includes sending the first Web page to one or more other email addresses. This includes, for example, broadcasting. In one embodiment, the first and other email addresses are those email addresses that meet one or more targeting criteria.

In one embodiment of the method, the sending includes sending a personalized version of the first Web page to one or more other email addresses. In one version, the first and other email addresses are those email addresses that meet one or more targeting criteria.

In one embodiment, the method further includes interpreting the URL request or form data of the retrieved second email message and retrieving a second Web page from a Web server connected to the computer network in accordance with the interpreted URL request or form data. The second Web page is in a Web browser format. The method transcodes the retrieved second Web page from the Web browser format to a third format consistent with one or more properties of a second email environment, such that the transcoded second Web page is directly operable in an instance of the email browser of the second email environment. Clearly, the second email environment may be the same as the first email environment. In this embodiment, the method further includes transmitting the transcoded second Web page to a third email address as a third email message. Again, the third email address and the second email environments may be the same as one or more previously encountered addresses and/or environments.

In one embodiment, the first Web page is generated by transcoding an original Web page in a Web-browser format to the first format, and the transcoding includes introducing none or more form tags and variables. In this embodiment, the interpreting includes interpreting any specialized form tags and variables introduced by any transcoding of the original Web page.

In one embodiment, the interpreting includes email-browser specific translating. Furthermore, in one embodiment, the interpreting includes determining the type of email browser.

In one embodiment, the second Web page includes one or more hyperlinks or a second set of form data. In the case that the retrieved Web page includes one or more hyperlinks, the transcoding includes converting one or more hyperlinks in the retrieved second Web page to one or more corresponding links in the transcoded second Web page, such that each corresponding link is directly operable in the instance of the email browser of the second email environment, and such that operating a corresponding link in the email browser instance causes a further email message containing the URL request of the corresponding hyperlink to be sent to a fourth email address via the computer network. In the case that the retrieved Web page includes a second set of form data, the transcoding includes converting one or more form controls in the second set of form data such that each converted form control is directly operable in the instance of the email browser of the second email environment, and such that operating a converted form control in the email browser instance causes a further email message to be sent to a fourth email address via the computer network. Form controls are those elements in a form that cause action, such as submit buttons. In general, not all elements of a form may cause an email message to be sent.

In one embodiment, the transcoding step further includes, in the case that the retrieved second Web page includes a relative URL, converting the relative URL to an absolute URL. Furthermore, in one embodiment, in the case that the retrieved second Web page includes one or more hyperlinks, the corresponding link is a "mailto" reference.

In one embodiment of the method, in the case that the retrieved second Web page includes one or more hyperlinks, at least one hyperlink in the retrieved second Web page is left intact such that a user clicking on the intact hyperlink in an instance of an email browser of the second email environment would cause a Web browser to launch and the URL of the clicked hyperlink to be retrieved via the computer network.

In one embodiment of the method, in the case that the retrieved second Web page includes one or more form controls that include action tags that have associated URLs, the transcoding includes converting the form controls to mailto references, such that clicking on the form controls in an instance of an email browser of the second email environment would cause a further email message containing the form with any filled-in data to be sent to a fourth email address via the computer network.

In one embodiment of the method that includes the retrieving, the transcoding step further includes, in the case that the retrieved second Web page includes one or more image references, retrieving the images of the image references and transmitting the retrieved images with the transcoded second Web page to the fourth email address.

In one embodiment of the method that includes the retrieving, the transcoding step further includes, in the case that 1) the retrieved second Web page includes one or more image references and 2) the images are stored in a cache, retrieving the images from a cache.

In one embodiment of the method that includes the retrieving, the retrieved images are transmitted as attachments to the third email message. In another embodiment, the transcoding step further includes replacing the image references with local image references.

In one embodiment of the method that includes the retrieving, the retrieving of the second Web page occurs according to a priority. In one embodiment, the method further includes inserting a request for the second Web page into a queue, and retrieving the request for the second Web page from the queue in priority order, such that the retrieving of the second Web page is per the retrieved request. In one embodiment, the retrieving of the request for the second Web page from the queue includes marking the queue entry to prevent any other access to the same queue entry. In such an embodiment, the method further includes marking the queue entry to allow other accesses to the queue entry once retrieval of the second Web page is complete.

In one embodiment of the method that includes the retrieving, the third format includes one or more properties in accordance with the URL request or form data. For example, the form request may include information about the email environment's inability to accept long emails or images, or that the particular user does not want images.

In one embodiment of the method that includes the retrieving, the transmitting of the transcoded second Web page is in accordance to the URL request to form data. For example, the third email address that the email is sent to may be included in a metavariable introduced by earlier transcoding.

Also described herein is a method of operating a Web server in communication with a computer network. The Web server is to provide one or more Web pages. This method includes retrieving a first email message sent to a first email address via the computer network. The email message contains a URL request or form data. The method further includes interpreting the retrieved first email message URL request or form data. The interpreting, for example, may include any email browser specific translating, and may include interpreting any specialized form tags and variable (e.g., metavariables) that may have been introduced by earlier transcoding. The method further includes retrieving a first Web page from the Web server in accordance with the interpreted URL request or form data. This first Web page is typically in a Web browser format, and may include one or more links such as hyperlinks to URLs, or may include one or more forms. The method further includes transcoding the retrieved first Web page from the Web browser format to a third format consistent with one or more properties of a first email environment, such that the transcoded first Web page is directly operable in an instance of an email browser of the first email environment. The method further includes transmitting the transcoded first Web page to a second email address.

Other aspects of each of the steps are similar to those described above in this Summary section for the embodiments that start off by sending a first Web page.

Also described is a carrier medium—for example, a computer software product—carrying one or more computer readable code segments for controlling a processing system to carry out a method of operating one or more Web pages by email, including computer readable code to effect one or more processors of the processing system to send a first Web page to a first email address via a computer network and to retrieve a first email message sent to a second email address via the computer network. The first Web page is in a first format consistent with one or more properties of a first email environment, and includes one or more of links or forms that provide for further interaction. The first Web page is directly operable in an email browser of the first email environment. The second email message includes a URL request or form data, and is generated as a result of a user directly operating the first Web page in an instance of the email browser of the first email environment.

Other embodiments of the carrier medium include the features of the methods described above in this Summary section.

Also described is an apparatus for operating one or more Web pages by email, including means for sending a first Web page to a first email address via a computer network and means for retrieving a first email message sent to a second email address via the computer network. The first Web page is in a first format consistent with one or more properties of a first email environment, and includes one or more of links or forms that provide for further interaction. The first Web page is directly operable in an email browser of the first email environment. The second email message includes a URL request or form data, and is generated as a result of a user directly operating the first Web page in an instance of the email browser of the first email environment.

Other embodiments of the apparatus include means for implementing the features of the methods described above in this Summary section.

Also disclosed herein is an apparatus for operating a Web server in communication with a computer network, including an emailer coupled to the computer network to send a first Web page to a first email address via the computer network. The first Web page contains one or more links or forms that provide for farther interaction, and is in a first format consistent with one or more properties of a first email environment such that the first Web page is directly operable in an instance of an email browser of the first email environment. The apparatus also includes an email retriever coupled to the computer network to retrieve a first email message including a URL request or form data, and an email interpreter coupled to the email retriever to interpret the URL or form data in the first email message to generate a Web page request. The apparatus also includes a queue coupled to the email interpreter to queue the Web page request, and a queue entry retriever coupled to the queue and to the computer network to retrieve the Web page request and to request the Web page according to the request. The apparatus also includes a transcoder for receiving a requested Web page via the computer network and for transcoding the received Web page from a second format to a third format consistent with one or more properties of a second email environment, such that the transcoded Web page is directly operable in an instance of an email browser of the second email environment.

Further aspects of the invention will be clear from the description herein.

BRIEF DESCRIPTION OF THE DRAWINGS

FIGS. 7A and 7B illustrate an exemplary email message intended for a user response, as displayed by the email browser and as coded in HTML, respectively.

FIG. 8 is a flowchart schematically illustrating transmitting a URL request or form data via email, according to an embodiment of the present invention.

FIG. 9 illustrates an exemplary email message for a user response as transmitted to the email proxy server, according to an embodiment of the present invention.

FIG. 12 illustrates an exemplary queue insertion according to an embodiment of the present invention that uses a SQL database to store the queue.

FIG. 14 illustrates an exemplary queue selection and update according to an embodiment of the present invention that uses a SQL database to store the queue.

FIG. 16 illustrates an exemplary HTTP request format.

FIGS. 18A and 18B illustrate in exemplary fashion the various elements of an email message as constructed by embodiments of the present invention.

FIGS. 19A and 19B illustrate the various elements of a Web page that are transcoded according to an embodiment of the present invention.

DETAILED DESCRIPTION

The present invention is now described more fully with reference to the accompanying drawings, in which various embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
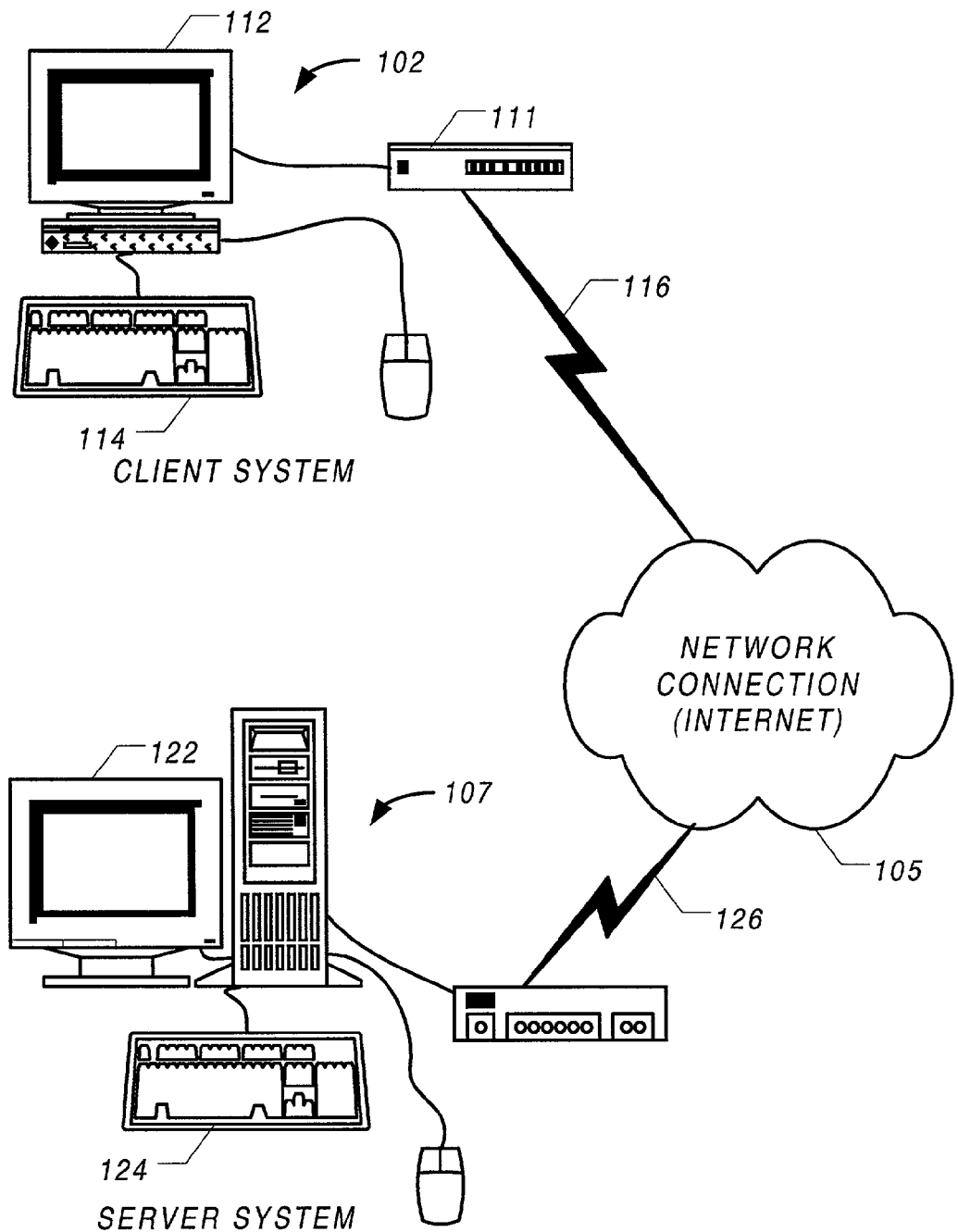
FIG. 1 is a schematic illustration of a conventional client-server communications configuration within which the present invention can be implemented.

Referring now to FIG. 1, a conventional client-server communications configuration within which the present invention can be implemented is schematically illustrated. Only one client system and one server system is shown in FIG. 1, and those of skill in the art would understand that a typical configuration may include many client systems and many server systems interconnected by a network. As is known to those with skill in the art, the network connection in a client-server environment may include public networks, such as the Internet, and private networks often referred to as "Intranets." While FIG. 1 shows the Internet 105, all references to Web pages shall hereinafter include Web pages residing on one or more servers such as server system 107 connected to the Internet, and also to Web pages residing on one or more servers connected to an Intranet. Thus, hereinafter, the term "Internet" shall incorporate the term "Intranet" and any references to accessing the Internet shall be understood to mean accessing an Intranet as well. Hereinafter, the term "computer network" shall incorporate publicly-accessible computer networks such as the Internet and private computer networks such as an Intranet. Furthermore, the term "email" shall incorporate email transmitted via both publicly-accessible and private computer networks. The terms "hypertext documents," "HTML documents," and Web page shall include Web pages residing within servers such as server system 107.

Users typically access the Internet via a computer or terminal referred to as a client system 102. Exemplary client systems 102 may include, but are not limited to a personal computer such as those made by Apple®, Dell®, IBM®, or other such companies. Exemplary client systems 102 may also include a workstation such as those made by Sun Microsystems, Inc., a personal digital assistant (PDA), a terminal, a network computer (NC), or an "Internet appliance" having limited computational capability, but having electronic mail (hereinafter referred to as "email") capability, the ability to connect to the Internet and either the ability to display HTML in email or to accept email attachments. Any such client system may be used in accordance with an embodiment of the present invention for operating Web pages using email.

In one embodiment, a client system 102 includes a central processing unit (CPU), memory, a display 112, a pointing device, a keyboard 114, and a mechanism, such as a modem 111 for connecting to the Internet 105. A pointing device, such as a mouse or keypad, if included, is connected to the central processing unit. The Internet connection 116 may be made via traditional phone lines, an ISDN link, a digital subscriber line (DSL) link, a cable modem link, a wireless link, a T1 link, a T3 link, via cable television, via an Ethernet network, and the like. The Internet connection 116 may be made via a third party, such as an "Internet Service Provider" ("ISP"). The Internet connection 116 may be made either by a direct connection of the client system 102 to the Internet, or indirectly via another device such as modem 111 connected to the Internet. In the latter case, the client system 102 may be directly connected to this device or connected via a local or wide area network (LAN or WAN). The data transfer between a client system 102 and the Internet, and between a Web server and the Internet may be at any rate.

In one embodiment, the client system 102 includes operating system software, and email browser software ("email browser," "email client") that can display HTML email. In accordance to an alternate embodiment, the email browser need not be able to display HTML, but can accept email that includes a file as an attachment.

Many different email browser systems have been implemented, falling into several categories based on their capabilities. The simplest handle only "plain text," meaning that the text of the message is displayed with no interpretation and no formatting can be performed on messages to be sent. Most "plain text" email browsers have been enhanced to interpret hyperlinks (including "mailto" hyperlinks) so that the hyperlink can be accessed directly within the email message. The next category of email browsers provides for "rich text" formatting, allowing different typefaces and sizes, bold and italic, and colors, as well as very limited justification and layout capabilities. A final category of email browsers is "HTML-enabled," meaning that they can display HTML just as a Web browser would.

HTML-enabled email browsers are implemented in several ways. "Webmail" systems are quite literally a Web site. These systems usually need to perform additional interpretation of the HTML since the message is displayed within the context of another page. True "client" software for HTML-enabled email often requires that Web browser client software (a "Web browser client," "Web browser") be installed and uses the library code of the Web browser to perform display operations. Both of these types of HTML-enabled email browsers disable certain capabilities of the HTML such as "JavaScript" capability, and exhibit a particular behavior in regard to HTML forms that may be beneficially used in some embodiments of the present invention.

Referring to FIG. 1, a user accesses a Web page by establishing communications (e.g., using TCP/IP) between the client system 102 and a server system 107 that includes the ability to host Web pages using a Web server software application (a "Web server"). For the majority of Internet communications, the client system communicates with a Web server using HTTP protocol over the TCP/IP link between the client system and the server system 107. Typically, the data transferred between the client system and the Web server are HTTP data objects (e.g., HTML data) as described above. A Web server may be a proxy that receives requests from a number of client systems and routes the requests to the appropriate Web server. The term Web Server is often used when referring to HTTP servers that serve Web pages.

Traditionally, accessing a Web page hosted by a Web server includes the following steps. During a typical communication, a client system 102, via Web browser client application software residing on the client system, makes a TCP/IP request for a Web page from the host Web server on server system 107 and displays the Web page on the client system display device 112. If the displayed Web page contains a hypertext link, the user can activate that link, and the Web browser will retrieve the linked Web page or object from an appropriate Web server.

Implementation on a Processing System

Figure 2:
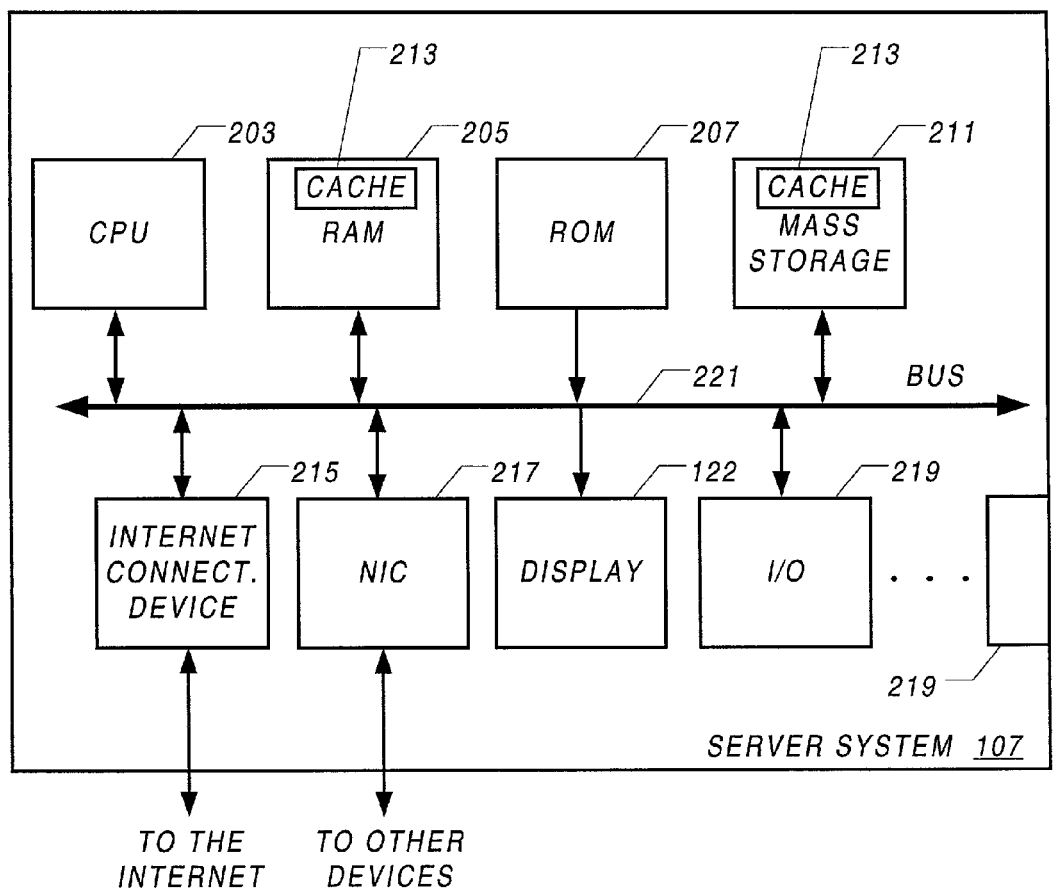
FIG. 2 is an exemplary architecture of a server system such as that on which the email proxy server resides, according to an embodiment of the present invention.

Server system 107 typically has a configuration of one or more standard computer systems (in general "processing systems"), which may even be similar to that of a client system 102, for example when the client system 102 is a standard computer system. As shown in FIG. 2, in one embodiment, server system 107 includes a bus 221, central processing unit (processor, CPU) 203, random access memory (RAM) 205, read only memory (ROM) 207, mass storage device 213, an Internet interface 215, a network interface card (NIC) 217, a display 122, and various other input/output devices (one of which is shown as 219). The mass storage device 211 may include a magnetic, optical, or other equivalent storage medium. The Internet connection device 215 may be any device used to connect to the Internet, and exemplary connection devices include, but are not limited to: a modem, a digital subscriber line (DSL) modem, a cable modem, an optical connection device, a T1 interface, a T3 interface, an E-1 interface and an E-3 interface. The input/output devices may include a pointing device such as a mouse and a keyboard 124. The Internet connection device 215 forms part of the Internet connection 126 for connecting system 107 to the Internet 105. The Web server software application handles requests from clients for documents, whether they are text, graphic, multimedia, or virtual. The Web server software application typically runs under the operating system of the server system 107.

Operation of the Invention

One embodiment of the present invention is implemented as an email proxy server that transmits and receives electronic mail messages to and from the user on one side, and transmits HTTP requests and receives HTTP responses on the other side. The proxy server thus uses electronic mail on the client-side connection to the proxy.

Normally, without use of the present invention, a single interaction with a Web server begins with the client (e.g., a Web browser application) requesting a specific Uniform Resource Locator (URL) or action on the Web server, and ends with the Web server performing that action and returning the result, typically as an HTML document, which is then interpreted and displayed by the Web browser client. However, the resulting document typically provides direct access to other URLs and actions (through hyperlinks and forms), thus a typical "session" involves a whole series of these single actions, one following the next.

In the present invention, this same cycle of interactions is performed through an email interface. In one embodiment of the invention, the user can initiate the interaction by sending an email with the URL indicated in one of the message's headers, for example the subject line. An email proxy server embodiment interprets the email message, uses HTTP to connect to the Web server, requests the appropriate page, transcodes the page from a first format to a second format to conform to certain requirements of the email environment, such that the transcoded Web page is directly operable in the user's email browser, and transmits the resulting page to the user's email address. The returned Web page may provide for further action by the user, such as links to additional URLs and forms. If a form, the user may fill out this form and "submit" it, which will have the effect of sending the data to the system using electronic mail via the email proxy server. In the embodiment that uses an HTML-enabled email browser, the data is delivered using a format very similar to the way in which Web browser clients transmit form data to the Web server. This begins the next cycle.

Unlike the Web browser interaction cycle, which typically begins with a client request, the email interaction cycle can begin in any one of several ways, some of which include:
1. The user sends a URL request through email.
2. The user accesses a previously received and saved email message, and uses one of the links or forms on that message, in which case the saved email acts as a kind of menu.
3. An operation that occurs on the Web site, either directly or through an email-initiated operation, triggers delivery of a Web page in the form of an email message, such an email message (i.e., the sent Web page) containing one or more of forms and/or hyperlinks that provide for further interaction.
4. A notification or reminder Web page sent as an email message is triggered based on a calendar event (event initiated at a particular date or time or both) or database change, such an email message (i.e., the sent Web page) containing one or more of forms and/or hyperlinks that provide for further interaction.
5. A broadcast email message is sent to many users, such message containing forms or hyperlinks or both that provide for further interactions.
6. A targeted email message is sent to many users that meet one or more targeting criteria, such message containing forms or hyperlinks or both that provide for further interactions.

One embodiment of the invention easily accommodates transference of the cycle of interaction from Web-based to email-based and vice-versa. This is accomplished through Web hyperlinks in the email messages and "mailto" hyperlinks on the Web pages. Although this process is not used in all embodiments of the present invention, it can add significant value in that the user can select the most desirable mode of interaction at any point in time.

In addition, since the cycle of interaction uses electronic mail, in another embodiment, more than one user can be included in the interaction. Such an embodiment can be used to implement sophisticated workflow systems using only standard Internet email and Web technologies.

In a typical dynamic Web site, HTML code is generated by a server-based application program, including but not limited to Common Gateway Interface (CGI) scripts and application server database systems. While these application programs are operating, they often perform many tasks in addition to generating the resulting HTML code, including interactions with a database, connecting to other computers on the Internet or local-area network, performing calculations, and many other operations.

Some embodiments of the present invention provide for scheduling an email message to be constructed and delivered to a user at a certain time or upon a certain condition being met. Different embodiments of the present invention include different mechanisms for scheduling this email operation. In one embodiment, the email proxy server and the Web server share direct access to a queue of email messages to deliver. In one such embodiment, the Web server includes software that enables it to insert items into the queue, and both the email proxy server and the Web server can insert items into this queue. The email proxy server retrieves entries from the queue for processing and delivery. In other embodiments, the queue of messages is only directly accessible to either the Web server or the email proxy server. In some embodiments, the queue is only directly accessible to the email proxy server. In those embodiment, the Web server may communicate insertions into the queue through the email proxy server. Those skilled in the art will find many means of accomplishing this, however, one method would involve including entry information in Web pages delivered to the email proxy server by the Web server. In embodiments where the queue is only directly accessible to the Web server, the email proxy server communicates both insertions and retrievals through the Web server. Those skilled in the art will find many means of accomplishing this, however, one method would include transmitting and receiving queue entries through HTTP POST operations utilizing application software on the Web server specifically designed for this purpose.

Figure 3:
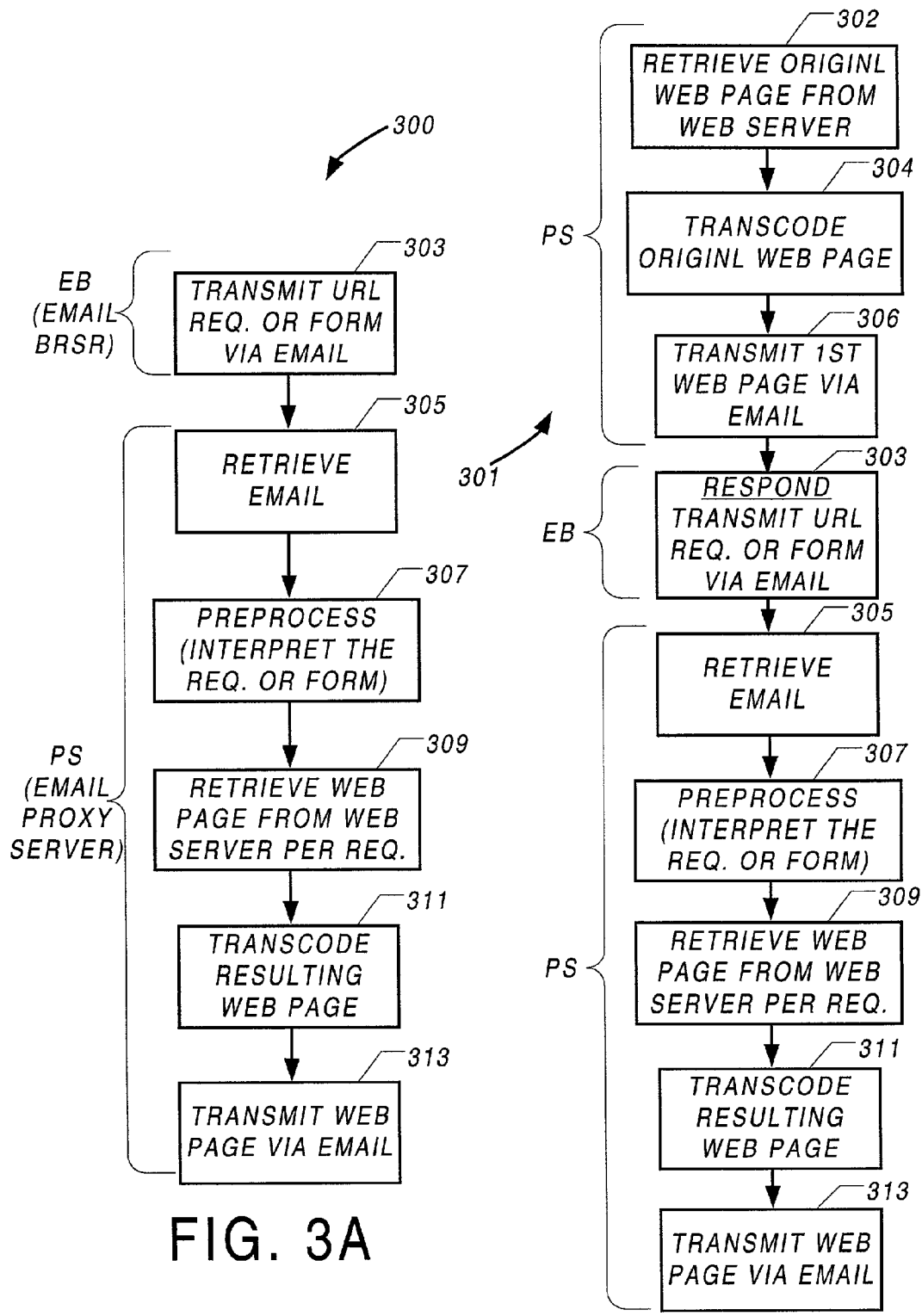
FIGS. 3A and 3B are flowcharts schematically illustrating the operation of a Web site through electronic mail, according to an embodiment of the present invention.

Referring now to FIG. 3A, a method 300 for operating a Web server through electronic mail, according to an embodiment of the present invention, includes: transmitting a URL request or form data via email (step 303); retrieving the request email (step 305); preprocessing the email (step 307), for example by interpreting the URL request or form data, retrieving the Web page according to the request email (step 309); transcoding the resulting Web page (step 311); and transmitting the Web page via email (step 313). The term transcoding refers to translating a Web page from a first format—the format produced directly by the Web server and displayable on a Web browser client—to a second format that can be directly operable in the email environment in accordance with one or more aspects of this invention. As is commonly understood, an email environment includes 1) an emailer such as sendmail, an SMTP server, or some other mechanism for sending email, 2) one or more intermediate relay stations that may interpret and/or modify the email, e.g., to wrap words, or reformat the email, and 3) an email browser, also called email reader or email client, to read and display the email. Directly operable means that any of one or more of the links or form controls such as buttons and pulldown menus, is directly and automatically operable as though it were in a Web browser but using email as the transport mechanism, for example by clicking on the link or control, rather than by requiring any cutting or pasting or other manual operations. Interpreting includes any email-environment (e.g., email browser) specific translating and includes interpreting any specialized form tags and variables introduced by earlier transcoding in the case that the URL or form data is transmitted via email by a user as a result of receiving and operating a transcoded Web page.

Referring now to FIG. 3B, a method 301 is shown. In step 306, a first Web page is sent to a first email address as a first email message. The first Web page includes one or more links or form controls that provide for further interaction by a user, and is in a format consistent with one or more properties of a first email environment. That format is such that the first Web page is directly operable in an email client, for example an instance of an email browser of the first email environment. The method now proceeds with one or more steps of method 300. The user transmits a URL request or form data via email (step 303), e.g., in response to the user operating the received first Web page, and the method retrieves the request email (step 305). In one embodiment, the email is preprocessed (step 307), for example by interpreting the URL request or form data. A Web page is retrieved according to the request email (step 309). The resulting Web page is transcoded (step 311); and transmitted via email (step 313).

In one embodiment, the first Web page may be stored pre-formatted in the format consistent with the first email environment. In another embodiment, method 301 includes retrieving an original Web page in a Web browser format (step 302) and transcoding the original Web page to the first format such that the transcoded Web page is directly operable by email.

In FIGS. 3A and 3B, those parts that, in one embodiment, operate in an email browser are denoted by EB, and those that operate in an email proxy server are denoted by PS.

Figure 4:
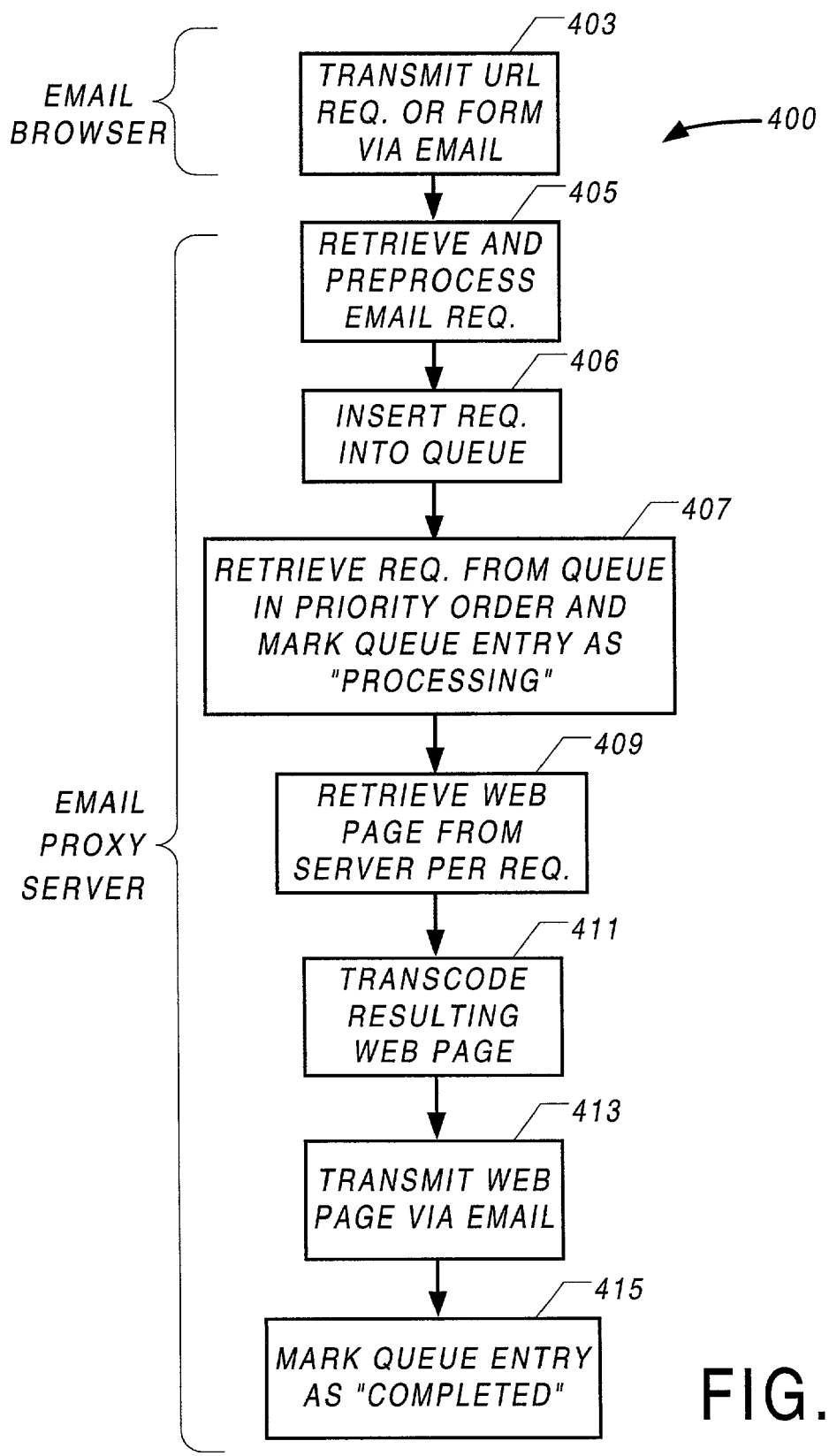
FIG. 4 is a flowchart schematically illustrating operation of a Web site through electronic mail, according to another embodiment of the present invention.

Referring now to FIG. 4, a method 400 for operating a Web server through electronic mail, according to one embodiment of the present invention, includes: transmitting a URL request or form data via email (step 403); retrieving and preprocessing the request email (step 405); inserting the request into a queue (step 406); retrieving requests from the queue in priority order (step 407); retrieving a Web page from the Web server according to the request (step 409); transcoding the resulting Web page (step 411); and transmitting the Web page via email (step 413). Note that in one embodiment, the steps shown in FIG. 4 may be as a result of a user receiving a first Web page as in FIG. 3A. Note also that as described further below, in one embodiment, an entry in the queue can be accessed by more than one instance of the method, so that when any request is retrieved from the queue, the queue entry is marked in some manner, such as marked "processing," to lock out other accesses to the same entry. Furthermore, after the Web page is retrieved, and in one embodiment, transmitted, the method in step 413, marks the queue entry to permit further accesses, for example by removing the "processing" marking or by marking as "completed" or by some other method. Any method may be used to mark completion. As described further below, an entry is inserted into the queue as "open" to indicate that it is ready to process and is marked "processing" when processed to indicate that processing has begun, thus preventing other instances of the method from processing the same entry. In one embodiment, once the processing is completed, it is marked "completed" to indicate that the processing is complete so that, for example, if there is a system crash, the "completed" request can be distinguished from the "processing" requests; only "processing" requests need then be processed. This ensures that no requests are lost, and that only few requests execute twice. Those requests for which the email has been sent but for which the record has not yet been marked "complete" would be executed twice.

Figure 5A:
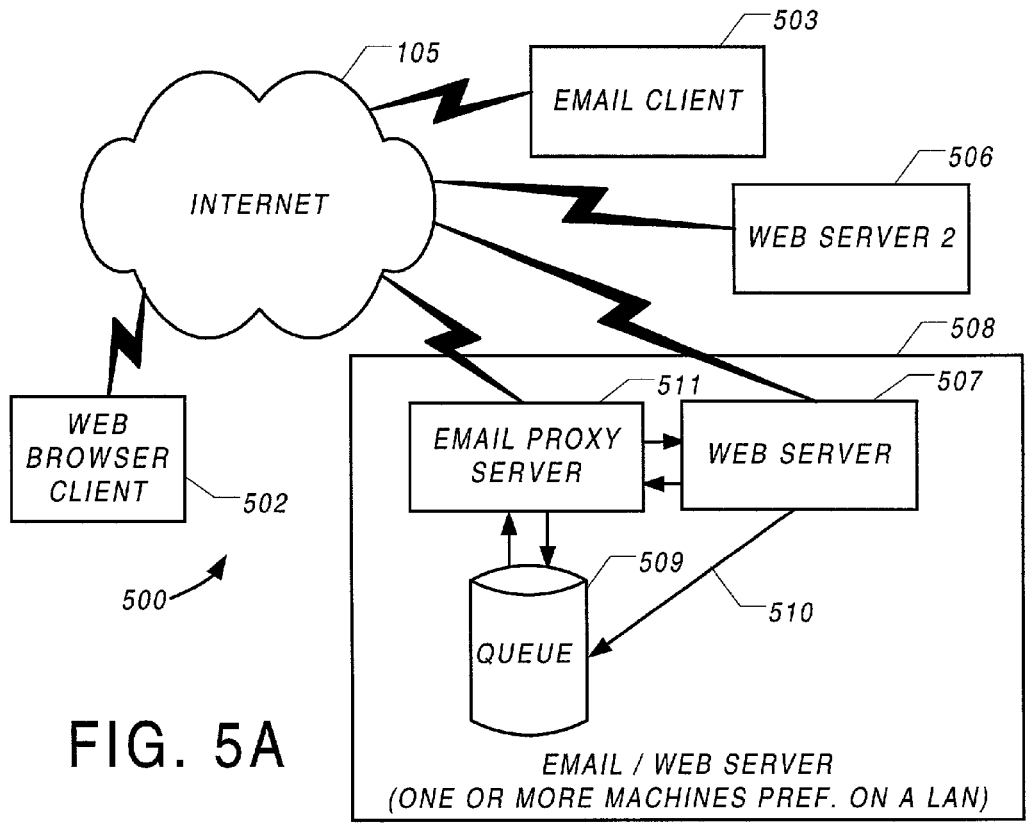
FIGS. 5A, 5B and 5C are diagrams schematically illustrating the information flows in operating a Web site via email, according to different embodiments of the present invention.

FIG. 5A shows a networking environment 500 and includes components used for carrying out inventive method 400 of FIG. 4. A Web server 507 stores one or more Web pages and is connected to the Internet 105. Web server 507 may be on a server system such as system 107 of FIG. 1 including the necessary software to store Web pages and respond to Web page requests. Note that the Web pages include dynamic Web pages that may be forms and that may include scripts or references to scripts such as CGI scripts and "Active Server Pages" (ASPs). A client system such as system 102 of FIG. 1, capable of connecting to the Internet, may include Web browser client 502, typically as application software. Alternatively, some or all aspects of the Web browser client 502 may be hard-wired. As is known to those skilled in the art, a typical Web access environment involves using the Web browser client 502 to access information on the Web server 507 via the Internet using a communication protocol such as Hypertext Transfer Protocol (HTTP). The Web browser client transmits a request for a Web page to the Web server 507, wherein the Web page is specified by the Web page's Uniform Resource Locator ("URL"). The Web server 507 in return transmits the resulting response to the request.

In an embodiment of the present invention, an email browser 503, typically application software operating on a client system such as system 102 of FIG. 1 is used to operate the Web server. The client system such as system 102 need not even have a Web browser software. In alternate configurations, some or all aspects of the email browser 503 may be hard-wired. Email browser 503 is connected to the Internet and transmits URL requests to an email proxy server 511 that is also coupled to the Internet. In one embodiment, proxy server 511 is embodied in software operating on a server computer such as the server system 107 shown in FIG. 2. The server computer may be the same server computer system as for Web server 507, or may be a separate server computer system. FIG. 5A assumes a separate server computer for Proxy server 511, so that both Web server 507 and email proxy servers 511 are shown connected to the Internet. The email proxy server 511 translates the request and, in accordance with the method 400 of FIG. 4, places it in a request queue 509 to enhance robustness and scalability. Method 300 of FIG. 3 does not include using the queue. If the queue 509 is used, the email proxy server 511 removes queue entries in priority order. The email proxy server requests and receives the indicated URL from the Web server just as would a Web browser or any other HTTP client. The Web server 507 responds and the email proxy server 511 sends the resulting response via email back to the email browser 503.

Note that while the term queue sometimes is used to mean a repository of items (e.g., tasks) to be accessed (e.g., performed) in a first in first out (FIFO) order, the term herein is broader and means a repository of items (e.g., tasks) to be accessed (e.g., performed) in any defined priority order, which may be FIFO, or may be any other priority, for example, based on certain attributes of the task.

Exemplary Web browser clients 502 include but are not limited to Netscape Navigator®, Microsoft Internet Explorer®, and NCSA Mosaic® (National Center for Supercomputing Applications, University of Illinois, Urbana-Champaign, Ill.). Exemplary email browsers 503 include but are not limited to Microsoft Outlook Express®, Eudora® (Qualcomm, Inc., San Diego, Calif.), Netscape Messenger®, and Hotmail® (Microsoft Corporation, Redmond, Wash.). Exemplary Web servers 507 include but are not limited to Apache HTTP Server (The Apache Group, http://www.apache.org/), Microsoft Internet Information Server®, and Netscape Server®.

As is known to those skilled in the art, a priority queue can be implemented in many ways, including but not limited to a database management system (DBMS) such relational DBMSs made by Oracle (Oracle Corporation, Redwood Shores, Calif.) and others, as a text file or a series of them, or in a memory-based data structure. One embodiment uses a relational DBMS with each request arranged as a single table of fields. The fields of the request table, described further below with reference to FIG. 12, are request_id, created_date, completed_date, request_type_id, request_status_id, priority, our_email, sendto_email, url, and request_method.

In accordance with one embodiment of the configuration shown in FIG. 5A, only the email proxy server 511 has the ability to add entries to the request queue 511. In accordance with an alternate embodiment of the configuration shown in FIG. 5A, the Web server has the ability to directly add entries to the request queue, using the link indicated by arrow 510. As dynamic Web pages are executed on the Web server, whether through the email proxy server 511 or directly from a Web browser client such as client 502, they may, as part of their operational logic, insert additional Web server requests in the request queue. These requests are processed by the email proxy server in the same manner as requests coming directly from email browsers.

The requests in queue 511 may be transmitted to any user and may access any Web page, including those on the Web server 507 as well as other Web servers such as Web server 506. Thus, the arrangement shown in FIG. 5A allows complex workflow systems to be implemented using the present invention without creating code specifically relating to the email delivery mechanism.

The configuration shown in FIG. 5A (with or without Web server to queue link 510) has a direct coupling between the email proxy server 511 and the Web server 507, so that the Web server and email proxy server are configured as a more closely connected unit 508.

Figure 5B:
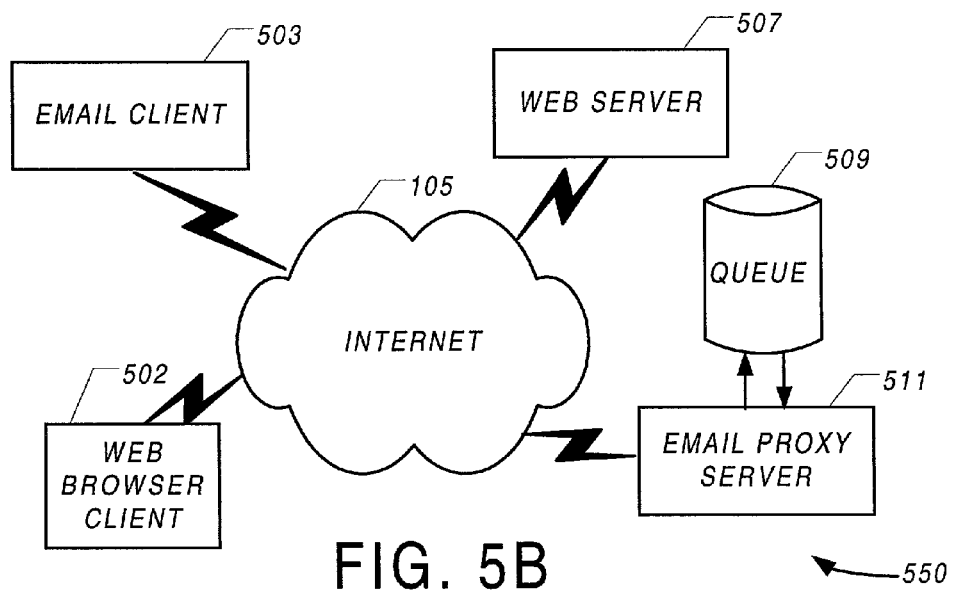

An alternate embodiment 550 is shown in FIG. 5B in which there is no direct coupling between the email proxy server 511 and the Web server 507. The Web server 507 need not be aware that it is being accessed through the email proxy server 511.

Figure 5C:
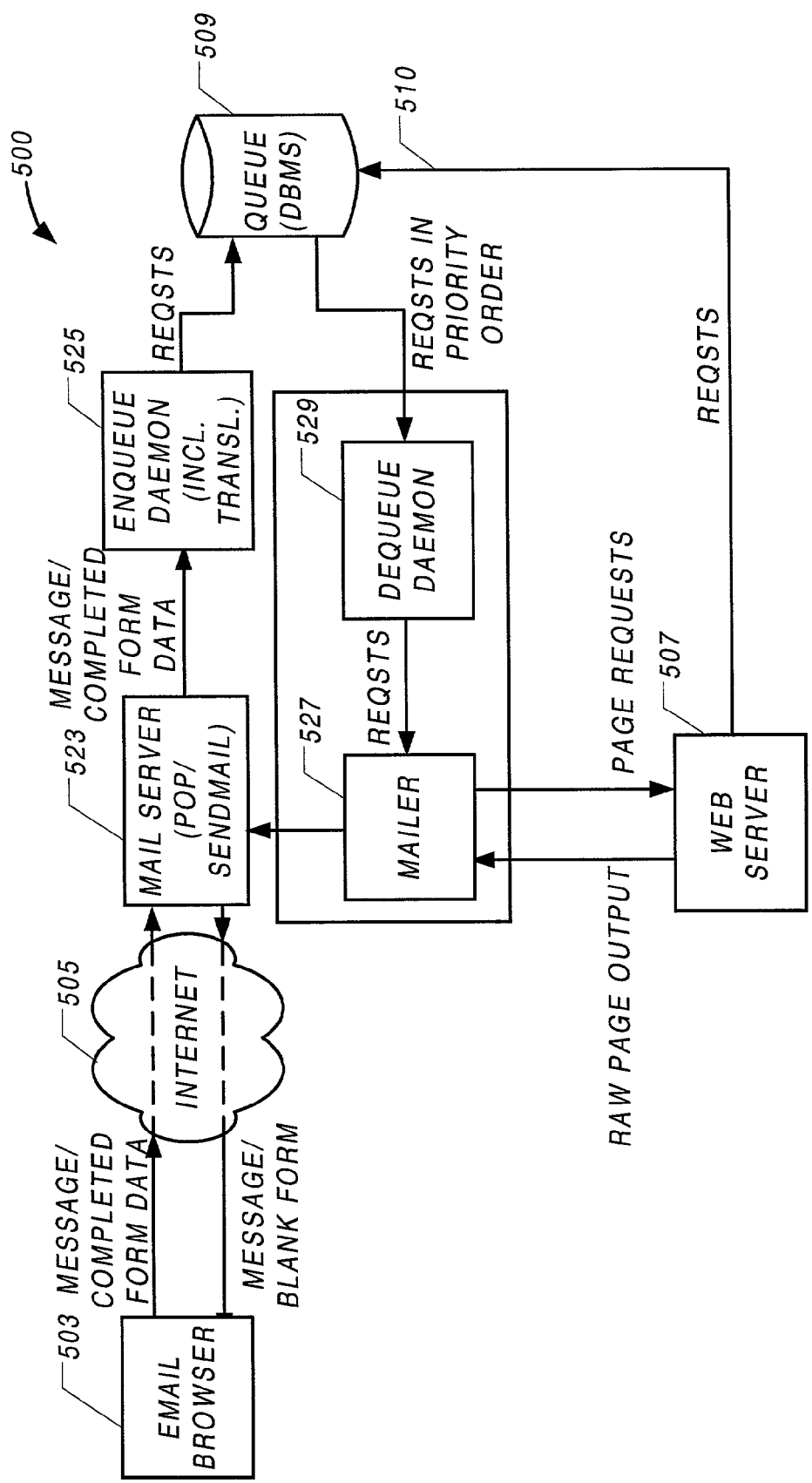

Referring now to FIG. 5C, the information flow and key modules of the embodiment of FIG. 5A are schematically illustrated. The email browser 503 transmits over the Internet 105 an email message containing either a simple URL request or the data resulting from a completed HTML form. Email proxy server 511 includes a mail server (in/out email module) 523 which includes an inbox. The message is delivered to the email inbox of the email proxy server. An "enqueue" daemon 525 periodically checks the inbox and retrieves any messages that have arrived, using a protocol compatible with the inbox, for example POP3. As is known to those in the art, a "daemon" is a program that executes in the background ready to perform an operation when required. The enqueue daemon 525 then preprocesses the email message by interpreting it as a URL request, placing all required information (including an execution priority) into queue 509 which, in one embodiment, is part of a database management system (DBMS). Another daemon, a "dequeue" daemon 529 periodically checks the queue 509 for new URL requests, retrieves them in priority order, and passes the requests to a mailer module 527. The mailer 527 formats the request information into an HTTP request, and, in one embodiment, connects to the Web server 507. The mailer 527 transmits the HTTP request and waits for a response. The Web server 507 locates the requested page or executes the specified application program to generate the response page. In some cases, an application program in Web server 507 inserts additional URL requests in the Queue through queue link 510.

Once the Web server 507 locates the requested page, Web server 507 then transmits the resulting Web page (whether or not dynamically generated) back to the mailer 527. The mailer 527 receives this page and, if connected to the Web server 507, disconnects from the Web server. The mailer 527 then translates the Web page contents for proper operation in an HTML email browser, retrieves and encodes all images referenced by the page, and builds an HTML email message, in one embodiment using the "multipart/related" MIME (Multipurpose Internet Mail Extensions) type. This message is transmitted to the email browser over the Internet using, for example, an SMTP email delivery system such as but not limited to the well known Sendmail program (Sendmail, Inc., Emeryville, Calif., and http://www.sendmail.org/) which in one embodiment is part of the mail server module 523.

Thus, referring to FIG. 5C, Web page requests may be by directly connecting to the Web server, or, referring to FIG. 5B, via the Internet. The Web page output similarly may be provided by direct connection or via the Internet. Similarly, the queue requests may be by direct connections of via the Internet.

In alternative embodiments, the queue 509 could be implemented using, for example, a series of text files, a memory-based data structure, or other storage mechanisms. In yet another alternate embodiment, queue 509 and dequeue daemon 529 are eliminated by passing request data directly from the enqueue daemon 525 to the mailer 527. In such an alternate embodiment, the enqueue daemon 525 and the mailer could also be merged into a single module.

Note that as shown in FIG. 5A, in one alternate embodiment, the Web server 507 is accessible to Web browser clients through the Internet 105, in some cases inserting additional URL requests in the queue through pathway 510. In other embodiments, the mailer 527 performs different translations of the Web page, for example, to operate in a text-only email browser, including using MIME types other than multipart/related.

The main elements of the various embodiments of the invention includes use of the email browser to deliver URL requests and receive results; retrieval and processing of the inbound message to translate it into a complete HTTP request; execution of the HTTP request; translation of the resulting page into a format compatible with the email environment, e.g., with the email browser and with the inbound translation process (on the next cycle); and transmission of the message back to an email browser.

Figure 6:
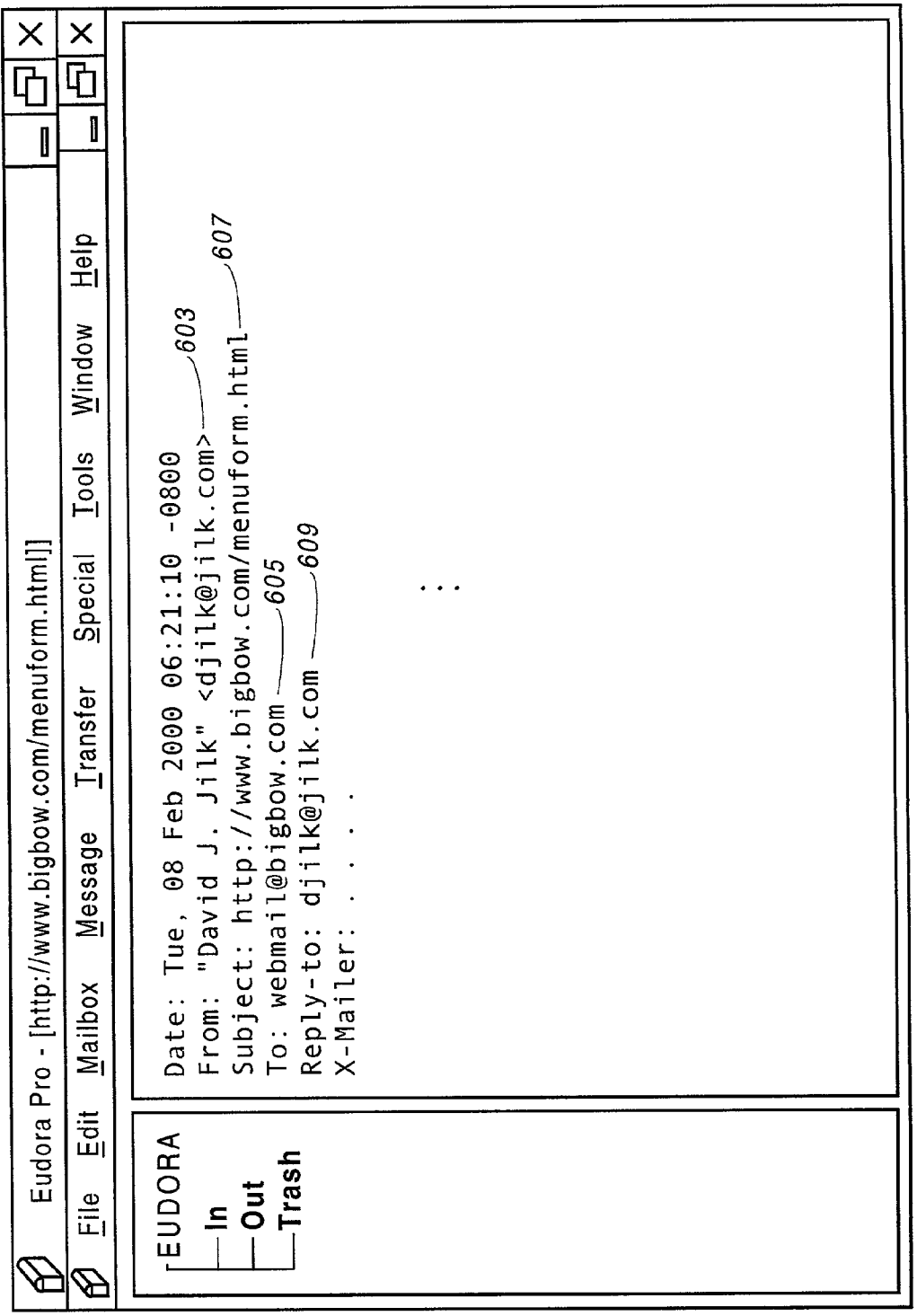
FIG. 6 illustrates an exemplary email message for an initial request for a URL.

One configuration for a URL request email message is illustrated in FIG. 6. This shows a window 600 of a typical email browser 502 containing an email message as would be received by email proxy server 511. As is known to those skilled in the art, an Internet electronic mail message generally conforms to consensually agreed upon standards. Internet standards are available through the Internet Engineering Task Force (IETF) (http://www.ietf.org/) and are set out in documents referred to as "Requests For Comments" or RFC's. The RFC's applicable to email messages include RFC-822 for the email format and RFC-821 for the Simple Mail Transfer Protocol (SMTP) that is typically used for transmitting email. In general, according to RFC-822, an email message is made up of a header section containing a plurality of header fields and a message body. Each header field has a field name and a field value, separated by a delimiter between the field name and the field value and a delimiter between header fields. Header fields provide information about the message or the author or the recipient, and include "To", "From", "Subject" "Date" and other header fields added to assist with understanding the message or troubleshooting transmission errors. Examples include "Message-Id", "Received" and "X-Mailer". All such header fields are not part of the body of the message. The message shown in FIG. 6 includes a "From" field 603, a "To" field 605, and a "Subject" field 607. Such an email message may contain a message body and other fields, attachments, and attributes without impacting the functioning of the present invention. The specified fields are used to complete an initial URL request through the email proxy server 511. The "From" field 603 indicates where the resulting page is to be delivered. As is known to those skilled in the art, in some cases the user will have configured the email browser with a distinct "Reply-To" address, and such a field is shown as 609. When present, the "Reply-To" field will override the "From" field 603 as the destination for the resulting Web page. The "To" field 605 indicates the email address at which the email proxy server is located. This address is typically known to the user in advance. In the illustrative example, the "To" field 605 shows that the email proxy server 511 is located at "Webmail@bigbow.com." The "Subject" field 607 indicates the fully qualified URL of the Web page being requested. Thus, this email is a URL request. If the "domain name" of the request is not indicated, the request will operate on a Web server specified as a default in the email proxy server 511.

The URL of the requested Web page need not refer to a static Web page, but may refer to a dynamic Web page. The email may, for example, be a result of displaying and responding to a form. For this, parameters may be needed. As is known by those skilled in the art, there are several ways of passing parameters. One embodiment uses the Common Gateway Interface (CGI) with the GET method, according to which a URL may include parameters, for example, following a "?" symbol in the URL. Thus, data about a form or any data associated with a Web page may be sent as part of the URL. For example, using the GET method to send data that var1 is value1 and var2 is value2 to a CGI script called abc.cgi that has the URL www.bigbow.com/cgi-bin/abc.cgi may be sent in as www.bigbow.com/cgi-bin/
abc.cgi?var1=value1&var2=value2.

Thus, the present invention includes specifying a URL with additional data. Note that some email browsers may limit the number of characters allowed in the Subject field and therefore limit the amount of such data as well as the length of the URL itself.

There are many possible alternative embodiments of a user-initiated URL request through email that are encompassed by the present invention. For example, the URL could be specified in the subject line while data (e.g., CGI data) could be specified in the standard name/value pair format in the body of the message, such message to be interpreted by the email proxy server as a CGI operation using the POST method. Alternatively, the data may be sent using both the POST and the GET method. Alternatively, the URL could be specified in another header rather than in the subject line. Alternatively the URL could be specified in the body of the message, thereby easing the length restrictions of the subject field. Modifying the invention to provide for these and other methods of initiating a URL request and/or passing parameters would be straightforward to those skilled in the art.

Referring now to FIGS. 7A and 7B, these illustrate an exemplary email message intended for a user response through a form. FIG. 7A shows the email in an HTML enabled email browser window 700, while FIG. 7B shows the source HTML code 750 for the form shown in FIG. 7A. Referring now to FIG. 7A, the form fields 709 are manipulated by the user just as they would be in a Web browser client window. When the values in the fields are satisfactory, the user presses the Submit button 711. Rather than transmitting an HTTP request, this form is set up to transmit an email message to the email proxy server. Referring now to FIG. 7B, the HTML source code 750 for this form is shown. The code is very similar to what would normally be found in an HTML form for a Web browser client, and in fact this code could be used successfully from a Web browser client to transmit the email message given an appropriate email browser. The elements of this HTML code that are specific to one embodiment of the invention are illustrated in greater detail below with reference to FIG. 19. Referring now to FIG. 8, the steps for transmitting a URL request or form data via email (step 403 of Method 400 of FIG. 4) according to one embodiment of the present invention, are schematically illustrated. This might be as a result of the user interacting with a Web page sent to the user that provides for direct operation in the email environment. Furthermore, this might be the first cycle of an interaction initiated by the user, i.e., the user is not completing a form (step 803) or interacting with a Web page sent by email. In a user intiation, in one embodiment, the user creates a new email message addressed to the email proxy (step 807). In the subject of the message, the user includes the fully-qualified URL of the Web page requested. The user then presses the Send (or similar) button.

The URL of the requested Web page need not refer to a static Web page and for this, parameters may be needed. One embodiment uses the GET method, according to which a URL may include parameters, for example, following a "?" symbol in the URL. The data can then be handled by the Web server using dynamic pages using, for example but not limited to, Common Gateway Interface (CGI) scripts or "Active Server Pages" (ASP).

Thus, when a request addressed to the email proxy server is created in step 807, that request may then be executed by the email proxy server with any parameters passed as the CGI "QUERY_STRING" using the "GET" method. Alternatively, in some embodiments these parameters may be incorporated into the email message in a manner that indicates the POST method should be used by the email proxy server with the parameters passed as the HTTP content. Any other method may be used to pass parameters, and how to modify the invention to so pass parameters would be straightforward to those skilled in the art.

If this is not the first cycle of the interaction, or the interaction is not initiated by the user, a Web page, e.g., an HTML form and/or hyperlinks will be available to the user in his email in-box. This might be from an initially sent Web page, or resulting from operations described later in the process. In this case, the user simply fills out the fields in the form or and presses a "submit" or similar button (step 805), or clicks on a link. The email browser formats an email message with the form data included as the message content using MIME types such as "application/octet-stream" or "application/x-www-url-form-encoded" but in any case with the data itself generally formatted, as would be the HTTP content resulting from a Web browser form.

Each individual email browser application may format the email message and the content slightly differently, however. The present invention accommodates these differences by including a special-purpose translator where required. For example, unlike some other email browsers, Microsoft Outlook Express uses a standard encoding method called 'quoted-printable' that replaces certain characters with the "escape introducer" "=" followed by the alphanumeric representation of the hexadecimal value of the escaped character. Thus, Microsoft Outlook Express encodes the symbol "=" as "=3D". Microsoft Outlook Express also limits the length of the lines to 76 characters. the "=" sign not followed by a hexadecimal representation indicates a line break not part of the orginal data. This is described in section 5.1 of the MIME RFC 1521. Microsoft Outlook Express and similar conforming email browsers indicate specify that "content-transfer-encoding=quoted-printable." In one embodiment this provides the information required for translating. Some email browsers may even have known bugs, and the translating can take such behaviour into account. It would be straightforward for those skilled in the art to examine the results of submitting messages through various email browsers and develop such special-purpose translators.

In either case, immediately or at some later time the user connects to the Internet and uses the email browser 502 to transmit this message and any other outgoing messages (step 809), the transmission being in the usual manner, which typically is through the well known simple mail transfer protocol ("SMTP").

Referring now to FIG. 9, an exemplary email message 900 for a user response as transmitted to the email proxy server 511, according to an embodiment of the present invention is illustrated. The originating email address 903 ("dan@checkoway.com" in this example) is the email address included in the "From" header of the message. Note that the "From" header includes more than just the email address, requiring that the address be extracted. The destination email address 905 ("Webmail@bigbow.com" in this example) is an address at which the email proxy server receives messages. There can be more than one such valid address for an instance of the email proxy server 511. The content type 907 indicates the data format to expect. There also is "Content-Transfer-Encoding" that indicates tells how to interpret the content section of the message. The email proxy server will handle encoded form data according to the specified encoding. The email browser name 909 indicates the email browser used to transmit the message. The email proxy server uses this to determine whether special parsing and formatting on the content is required. In the illustration, the email browser is Microsoft Outlook Express version 5.00 and interpreation of the formatting according to the "content-transfer-encoding=quoted-printable." is required. Only the first and part of the second line of the message body are shown in FIG. 9. The "equal sign" substitution 911 is the code that the particular email browser uses to encode an "=" and which should be replaced. The "newline" substitution 915 is the code that the particular email browser uses to encode a newline character and which should be replaced. The special character encoding 913 (and all like examples) is a hexadecimal value preceded by an "%" sign (e.g., %3A) and representing the ASCII character indicated by the hexadecimal value. This is a standard HTTP encoding technique for form data as well as URLs that is well known to those skilled in the art. The content separator 917 is a blank line (two sequential newline characters) that indicates the beginning of the message content.

Figure 10A:
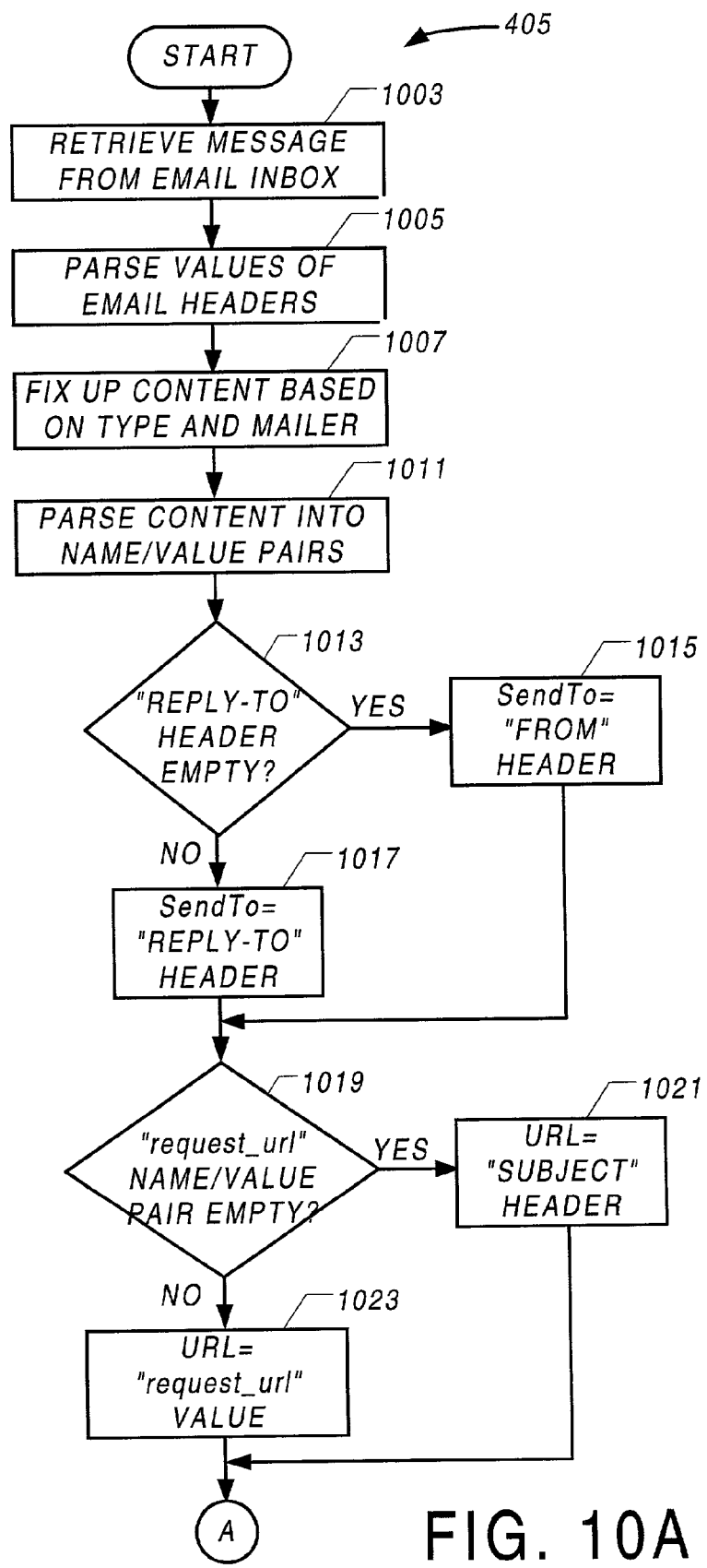
FIGS. 10A and 10B are a flowchart schematically illustrating retrieving and preprocessing the request email, according to an embodiment of the present invention.
Figure 10B:
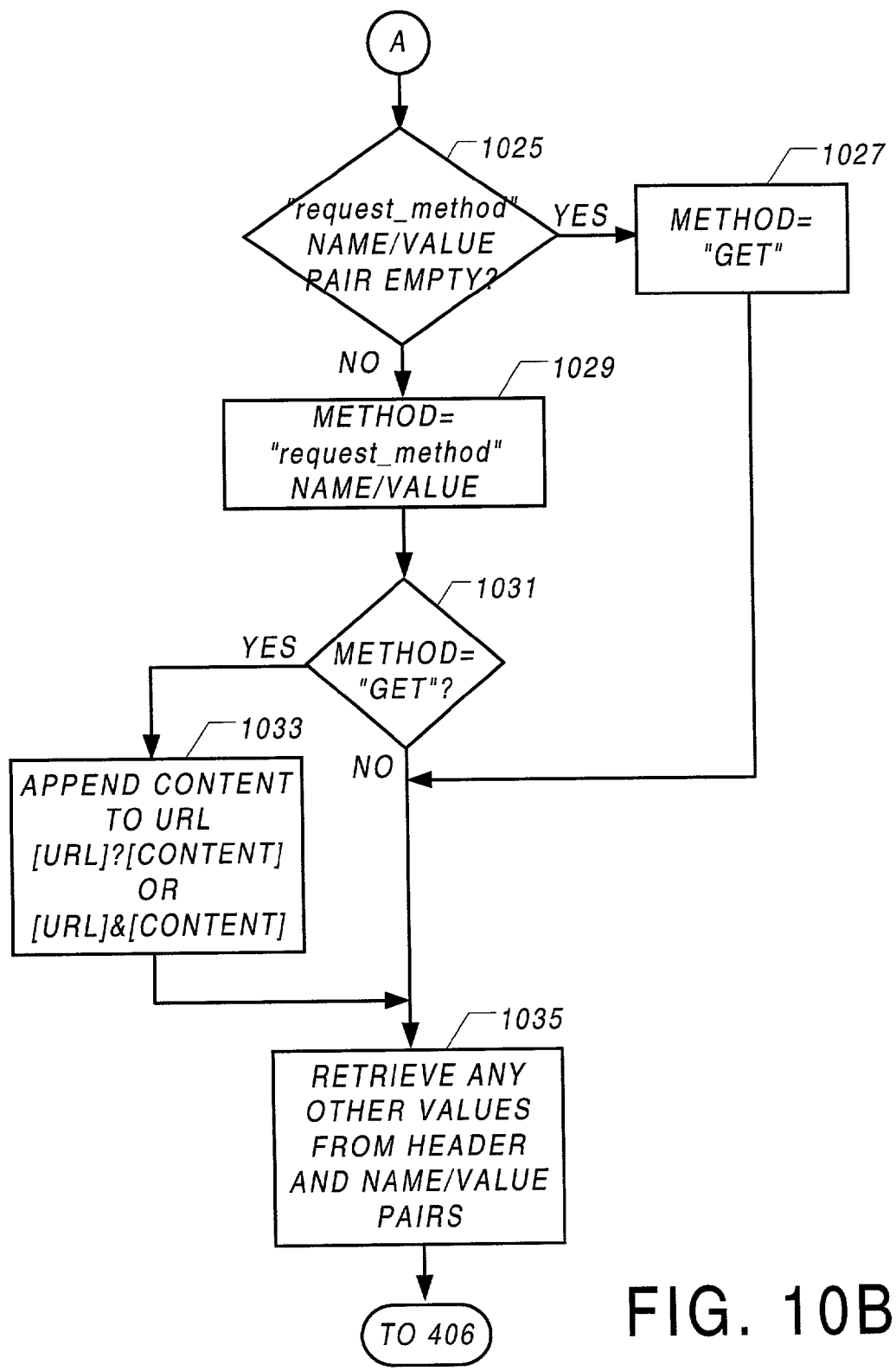

Referring now to FIGS. 10A and 10B, according to one embodiment of the present invention, operations for the email proxy server 511 retrieving and preprocessing an email for a Web request are schematically illustrated. As is known to those skilled in the art, electronic mail is received by email servers and directed to individual mailboxes. Various servers, protocols, and systems can be used to receive and store electronic mail; exemplary systems include but are not limited to Microsoft Exchange Server, implementations of the Post Office Protocol Version 3 (POP3), and implementations of Internet Messaging Access Protocol (IMAP). In all cases, an email browser system accesses an email server using the appropriate protocol and retrieves the message. In one embodiment of the present invention, an email browser uses the POP3 protocol to periodically check the appropriate email inbox and retrieve a message if available (step 1003).

The email message includes header fields that provide information about the message or the author or the recipient, and include "To", "From", "Subject" "Date" and other header fields added to assist with understanding the message or troubleshooting transmission errors. Examples include "Message-Id", "Received" and "X-Mailer" All such header fields are not part of the body of the message. The email proxy server 511 parses the values of these headers and places them in a first lookup table we call the header lookup table(step 1005).

The actual content of the message (the message body) follows the headers, typically after two consecutive "newline" characters. In a limited number of circumstances, this content may require certain reformatting based on the values "Content-Type" header and the "X-Mailer" header, and step 1007 of step 405 fixes up the content of the email based on the email type and the email browser. Thus, the interpreting may include email-browser specific translating, and may include determining the type of email browser. As an example, the Microsoft Outlook Express email browser uses the standard 'quoted-printable' encoding method; this situation is detected from the X-Mailer header or from the "content-transfer-encoding=quoted-printable" header. Any characters that need to be interpreted can then be so interpreted. Superfluous characters also may need to be removed. It would be clear to one skilled in the art how to include methods to repair the content by examining instances of the content produced by a specific email browser or under a specific Content-Type and determining how it deviates from standard formats.

Once the content is repaired in step 1007, it is parsed into "name/value pairs" (step 1011), and these are, in one embodiment, inserted into a second lookup table, the name/value pair lookup table.

The following Table 1 is an example of the header lookup table for the HTML code for the message shown in FIG. 9:

TABLE 1

| | |
|---|---|
| From | dan@checkoway.com |
| To | Webmail@bigbow.com |
| Subject | Form posted from Microsoft Internet Explorer. |

TABLE 1-continued

| MIME-Version | 1.0 |
| Content-Type | application/octet-stream |
| Content-Transfer-Encoding | quoted-printable |
| Content-Disposition | attachment |
| X-Mailer | Microsoft Outlook Express 5.00.2919.6600 |
| X-MimeOLE | Produced By Microsoft MimeOLE V5.00.2919.6600 |

The following Table 2 is an example of the name/value lookup table for the HTML code of the form shown in FIGS. 7A and 7B as submitted:

TABLE 2

| REQUEST_URL | http://www.bigbow.com/catalog.asp |
| REQUEST_METHOD | POST |
| catalog | Bed+n+Bath |
| recipient | Checkoway, +Dan |
| submit | submit |

With the headers and the name/value pairs available in lookup tables, the email proxy server now can determine various pieces of information for processing the Web request.

First, the location where the result of the request is to be emailed ("SendTo") is determined. If the "Reply-To" header is empty (step 1013), then SendTo is set to the email address in the "From" header (step 1015), otherwise the email address in the "Reply-To" header is used (step 1017).

Next, the URL to be requested ("Request URL") is determined. If the "request_url" name/value pair is empty (step 1019), the Request URL is set to the "Subject" header (step 1021), otherwise the "request_url" value is used (step 1023).

Next, the HTTP method by which the URL will be requested ("Request Method") is determined. If the "request_method" name/value pair is empty (step 1025), then Request Method is set to "GET," (step 1027), otherwise the "request_method" name/value pair is used (step 1029). If the result of step 1029 (not step 1027) is that the Request Method is "GET," then the content (as repaired) is appended to the Request URL (step 1033). As is known to those skilled in the art, the GET method requires that the content data be included following a "?" in the URL. If there is already content data in the URL, as may be easily determined as part of step 1033, then additional data can be appended following an "&" (ampersand) character.

Because some embodiments of the present invention insert additional information into Web pages that are transmitted via email, in one embodiment, one embodiment distinguishes between variables that are part of the original Web page and those that are inserted by the email proxy server, the latter being designated as "metavariables." Metavariables are typically used by the email proxy server 511 to communicate with itself through multiple interaction cycles. In one embodiment of the present invention, metavariables are incorporated as hidden form variables in the form (variables of type "hidden"), for example, "REQUEST URL" and "REQUEST_METHOD." Thus, any other "metavariables" that might affect the processing of the Web request are retrieved from the headers and the name/value pairs. In one embodiment of the present invention, no additional metavariables are required. In other embodiments, including but not limited to those exemplary possibilities detailed in the query 1200 shown in FIG. 12 and described below, the Web request is controlled more extensively by the content and headers of the email message. This can be used, for example, by the mailer 527 of the email proxy server 511 to communicate information about the request to the enqueue daemon 525 of the email proxy server using hidden form variables.

One example of an additional metavariable, wherein the metavariable communicates additional information to both the email proxy server 511 and to the Web server, is in circumstances where the Web server maintains session identifiers that time-out (are cancelled after a period of time). A metavariable could be used to communicate the original session identifier or to indicate that the request was handled through email and delays should be handled differently.

Figure 11:
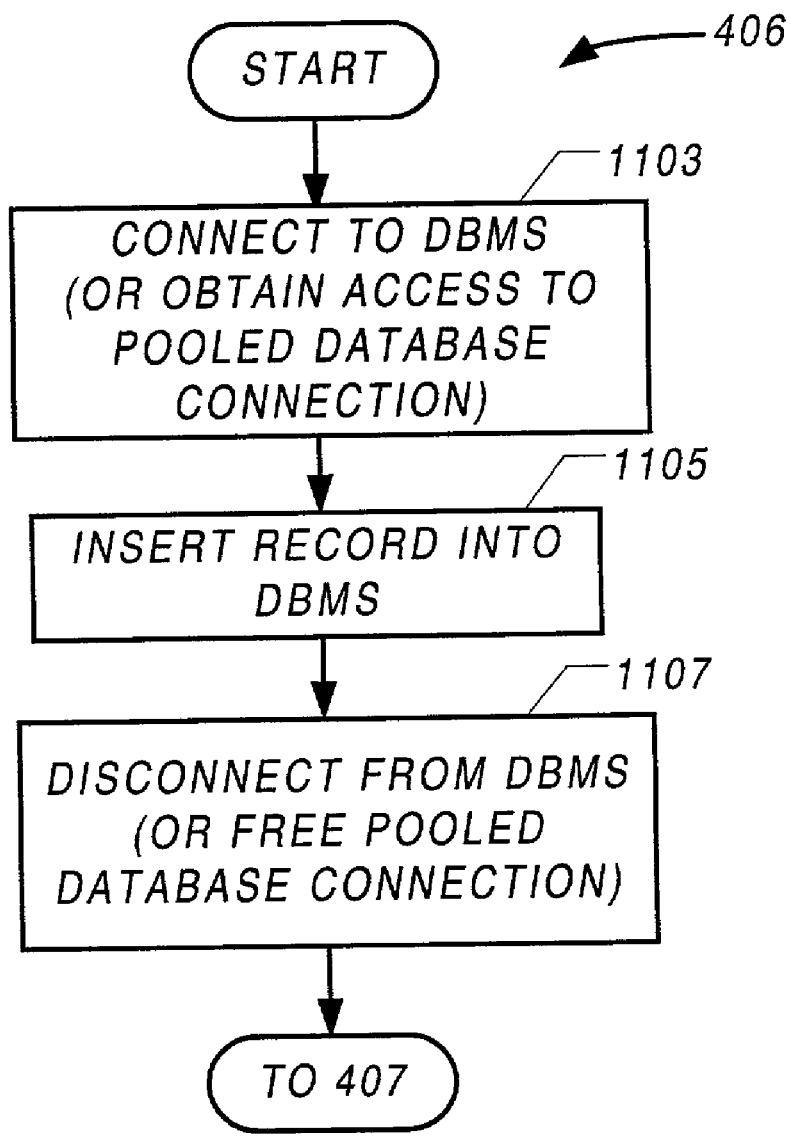
FIG. 11 is a flowchart schematically illustrating inserting the request into a queue, according to an embodiment of the present invention.

Referring now to FIG. 11, according to one embodiment of the present invention, operations for the email proxy server 511 to insert a Web request into a queue 509 are illustrated. In this embodiment the queue is implemented as a table in a relational database management system (DBMS). Other embodiments may use other structures for the queue. The contents of the table of our embodiment are illustrated in more detail in the example query 1200 shown in FIG. 12 and described herein below.

As is known to those skilled in the art, access to a DBMS may use specialized code libraries or "pre-compilers" that provide for, at a minimum, connection to the DBMS, transmission of a query, for example, a Standard Query Language (SQL) query to the database, and a means of retrieving the query results. Exemplary systems for such access include but are not limited to Oracle OCI and Oracle Pro*C (Oracle Corporation, Redwood Shores, Calif.), and Microsoft ODBC (Microsoft Corporation, Redmond, Wash.). As is known to those skilled in the art, it is common to create a pool of connections to the DBMS and store them for later use in memory-based data structures. To insert the request into the queue, a new connection is open or a pooled connection is retrieved (step 1103). The insertion query 1200 (FIG. 12) is executed by transmitting it to the DBMS through the connection (step 1105). An insertion query does not return a result table, so the next step is to close the connection to the DBMS or free the connection to the pool (step 1107).

In one embodiment of the present invention, this procedure in FIG. 11 can also be followed by a Web server 507 inserting a request in the queue 509, as indicated by the arrow 510 in FIGS. 5A and 5C.

FIG. 12 shows pseudo-code 1200 for a Standard Query Language (SQL) query to add a row to a table in a database management system (DBMS), such as Oracle 8i. According to an embodiment of the present invention, such an operation is used to add entries to the request queue by specifying appropriate values for all columns in the table. This pseudo-code 1200 therefore illustrates an insertion operation, and also describes the columns included in one embodiment of the table that represents the request queue.

The request_id 1203 is a unique identifier for the table row and is generated automatically by the DBMS. The created_date 1205 is the date and time this request was first entered into the database, and can be used as a secondary sort column for prioritization. The request_type_id 1207 indicates a category of request; in the illustration it indicates that the source of the request was an incoming email message, as opposed to an entry sourcing from the execution of a Web page through link mechanism 510. In other embodiments, the request_type_id might be specified as a "metavariable" within the form data and could represent categories other than the source of the request. The request_status_id 1209 is used to ensure that requests are performed once and only once; in the illustration the request_status_id is set to "open," meaning that the request has not yet begun processing. The priority 1211 indicates the urgency with which the request should be executed; in the illustration the entry is added to the queue with top priority. In other embodiments the priority might be specified as a "metavariable" within the form data or determined based on any other factors available to the email proxy server 511 at the time the request is created. The our_email 1213 represents the email address to which the original request (if any) was addressed. This allows a single instance of the email proxy server to handle multiple inbound email addresses, possibly resulting in different behavior or prioritization. In the illustration the value is obtained from the header of the inbound message as part of step 1035, which in turn results from the "To" field 605. The sendto_email 1215 is the email address to which the result of the request will be sent. In the illustration, the request results from an inbound request to the email proxy server 511 and is obtained in steps 1013–1017. In other embodiments, the sendto_email could also be specified as a "metavariable" within the form data. In other circumstances and embodiments, such as a request sourcing from the execution of a Web page through link mechanism 510, the sendto_email might be determined by other factors available to the Web server 507 or email proxy server 511. The url 1217 is the URL that is to be accessed through a Web server such as Web server 507. In the illustration, its value is obtained from steps 1019–1023, with possible modifications at step 1033, and it is a fully-qualified URL (meaning the domain and path hierarchy are indicated in full). The request_method 1219 is either "GET" or "POST." As is known to those skilled in the art, these are the two primary methods of accessing a complete URL under the HTTP protocol. In the illustration, its value is obtained from steps 1025–1029. The post_content 1221 is the data to be transmitted in the HTTP request to the Web server 507. As is known to those skilled in the art, a POST operation transmits the information from an HTML form as the "Content" of the HTTP request in a standard format. In the illustration, the post_content is obtained from the actual content of the email message, as modified in step 1007.

Figure 13:
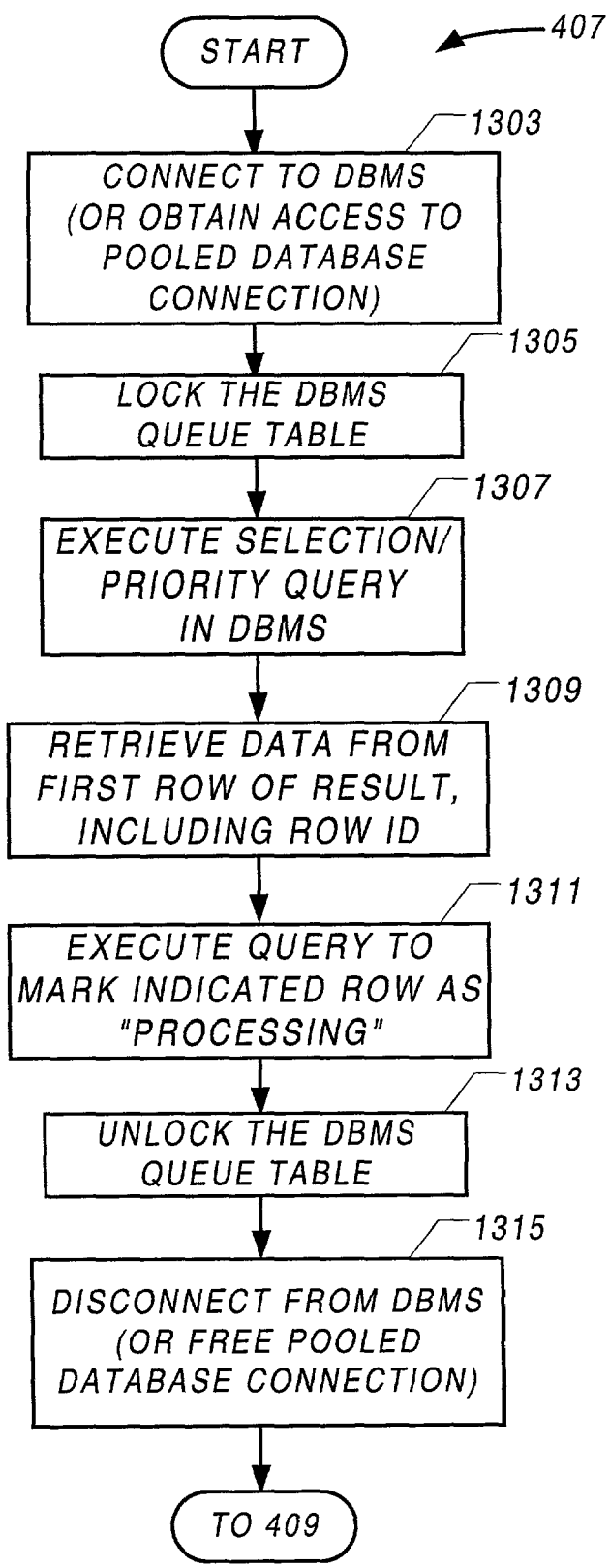
FIG. 13 is a flowchart schematically illustrating retrieving requests from the queue in priority order, according to an embodiment of the present invention.

Referring now to FIG. 13, according to one embodiment of the present invention the operations to retrieve requests from the queue in priority order are schematically illustrated. While some embodiments include a single email proxy server, one embodiment of the present invention provides for one or more instances of the email proxy server 511 operating simultaneously. An embodiment that provides for more than one instance of the email proxy server 511 is referred to below as "parallel retrieval embodiment"). Such instances of the email proxy server 511 thus retrieve and process requests from the same queue. The parallel retrieval embodiment provides scalability, in that higher volumes of requests can be distributed among multiple computers, and robustness, in that the failure of one computer or instance will not cause the entire system to stop operating.

To retrieve requests from the queue, a new database connection is opened or a pooled database connection is retrieved (step 1303). In parallel retrieval embodiments, the DBMS queue table is then locked from access by other processes (step 1305) so that the selection and reservation of a request to process is not subject to conflicts and/or "race" conditions with other processes. The retrieval query 1400 (see FIG. 14) is then executed by transmitting it to the DBMS through the connection (step 1307). The data from the first row of the result set, including the unique row identifier request_id, is accessed (step 1309) using techniques appropriate to the code library or pre-compiler through which the DBMS is being accessed. In parallel retrieval embodiments, using the same connection to the DBMS, an update query is executed (step 1311) that changes the request_status_id to "processing" for the row indicated by request_id. This reserves the request for the currently executing instance until it is completed. Again in parallel retrieval embodiments, the DBMS queue table is then unlocked (step 1313) so that other instances may retrieve other requests from the queue. The next step is to close the connection to the DBMS or free the connection to the pool (step 1315).

In embodiments unconcerned with parallel retrieval processing, steps 1305, 1311, and 1313 can be eliminated. As those skilled in the art will appreciate, other means of implementing the queue 509 (such as text files) would require an entirely different series of steps for retrieving the requests from the queue in priority order, and for those skilled in the art such an implementation would be straightforward.

Referring now to FIG. 14, an exemplary SQL query 1400 for retrieving requests from the queue in priority order is illustrated. According to one embodiment of the present invention, the priority order is determined by an explicit priority value in element priority 1211 of the table (see FIG. 12), whereby lower values represent higher priority requests. Within identical values of the priority, a FIFO ordering is used. Other embodiments might include other fields in the request table and base the priority order on those fields. In one embodiment, request records that have been completed are retained in the database. Thus in the query illustrated, the records are filtered to include only those that have not yet been completed.

Figure 15:
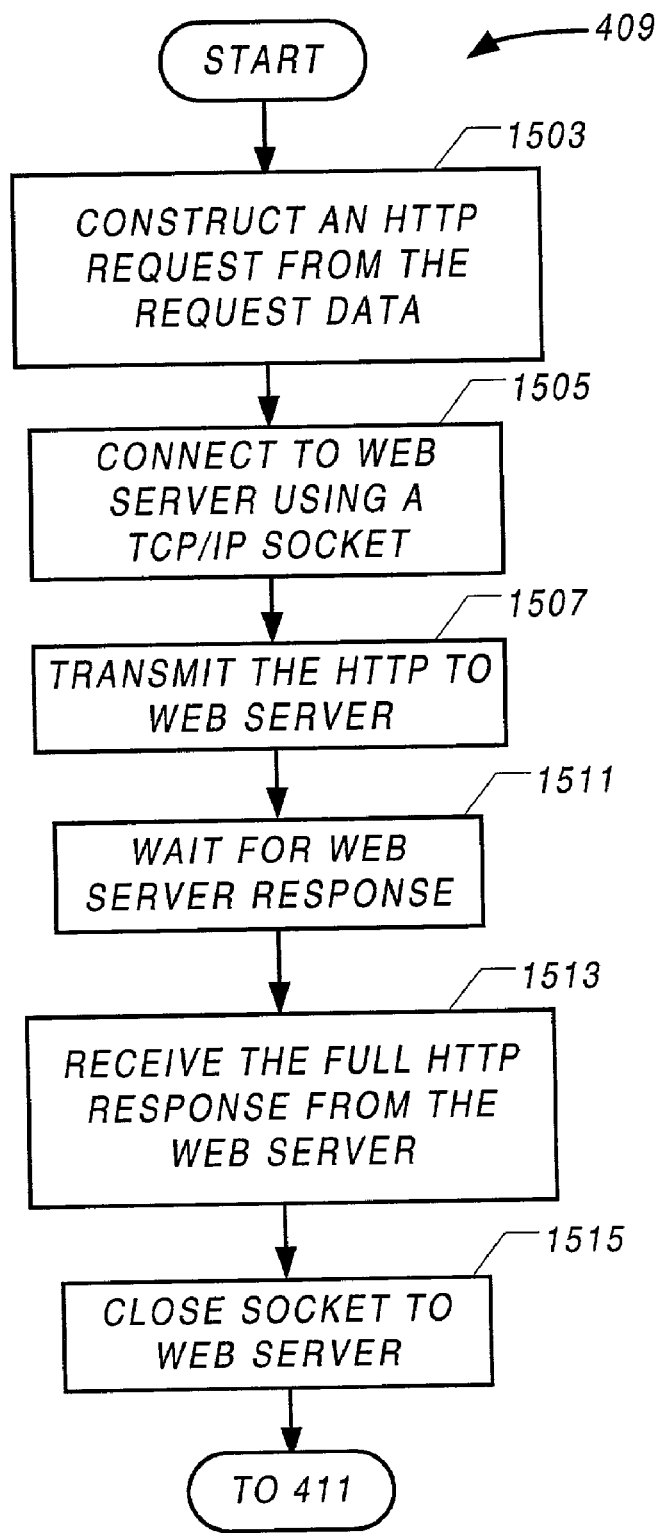
FIG. 15 is a flowchart schematically illustrating retrieving a Web page from the Web server according to the request, according to an embodiment of the present invention.

Referring now to FIG. 15, the operations involved in retrieving a Web page from the Web server according to the request are schematically illustrated. As those skilled in the art will appreciate, the operations illustrated are the same as those followed by any client software in performing an HTTP request according to the HTTP specification (version 1.0 in RFC-1945 and version 1.1 in RFC-2068), and many alternative embodiments are possible. Numerous instances of high-quality source code that performs the operations shown in FIG. 15 are available for examination, including the source code for Netscape Navigator (Netscape Communication Corporation, Mountain View, Calif.). In addition, numerous code libraries are available to complete these operations by simply specifying the elements of the request and indicating the server that is to execute them, and such libraries could be used in alternative embodiments. As one embodiment is a type of proxy server, an additional measure of control is valuable and the operations are implemented directly.

An HTTP request is thus formatted (step 1503) using the data from step 1309 according to the HTTP specification and as illustrated in exemplary form in FIG. 16. A connection is made to the Web server 507 (step 1505), in one embodiment, a TCP/IP socket connection, using, for example, the "Winsock" library under the Microsoft Windows operating environment or the "Berkeley sockets" library under variants of UNIX. Those skilled in the art will find straightforward the implementation of TCP/IP socket connections and transmissions. The HTTP request is transmitted to the Web server using the connection (step 1507), the system waits for the response (step 1511) and the HTTP response is received from the Web server 507 over the Web server connection. The Web server (e.g., socket) connection is then closed either by the system or the Web server.

Referring now to FIG. 16, an exemplary HTTP request 1600 is shown to illustrate the format. The command method 1603 ("POST" in the example) indicates the type of operation the Web server is to perform. The path identifier 1605 indicates the specific Web page or application program to execute ("test. cgi" for this example). The protocol specifier 1607 indicates the HTTP protocol and the version. The content type 1609 indicates the type of data that will be included in the content section 1617, allowing the Web server to properly interpret this data. The content type in the illustration is commonly used to indicate that the content is data posted from a form. The user agent 1611 indicates which software system has constructed and transmitted the request; in the illustration it is Microsoft's Internet Explorer Web browser ("MSIE"). In another embodiment, the user agent would be identified as the email proxy server by replacing "MSIE" with another name, such as, for example, "BigBowEmail." The content length 1613 indicates the number of characters in the content section 1617. The content start indicator 1615 is a blank line (two sequential newlines). The content section 1617 can contain any non-binary data. In the example and in one embodiment, it contains encoded name/value pairs.

Figure 17:
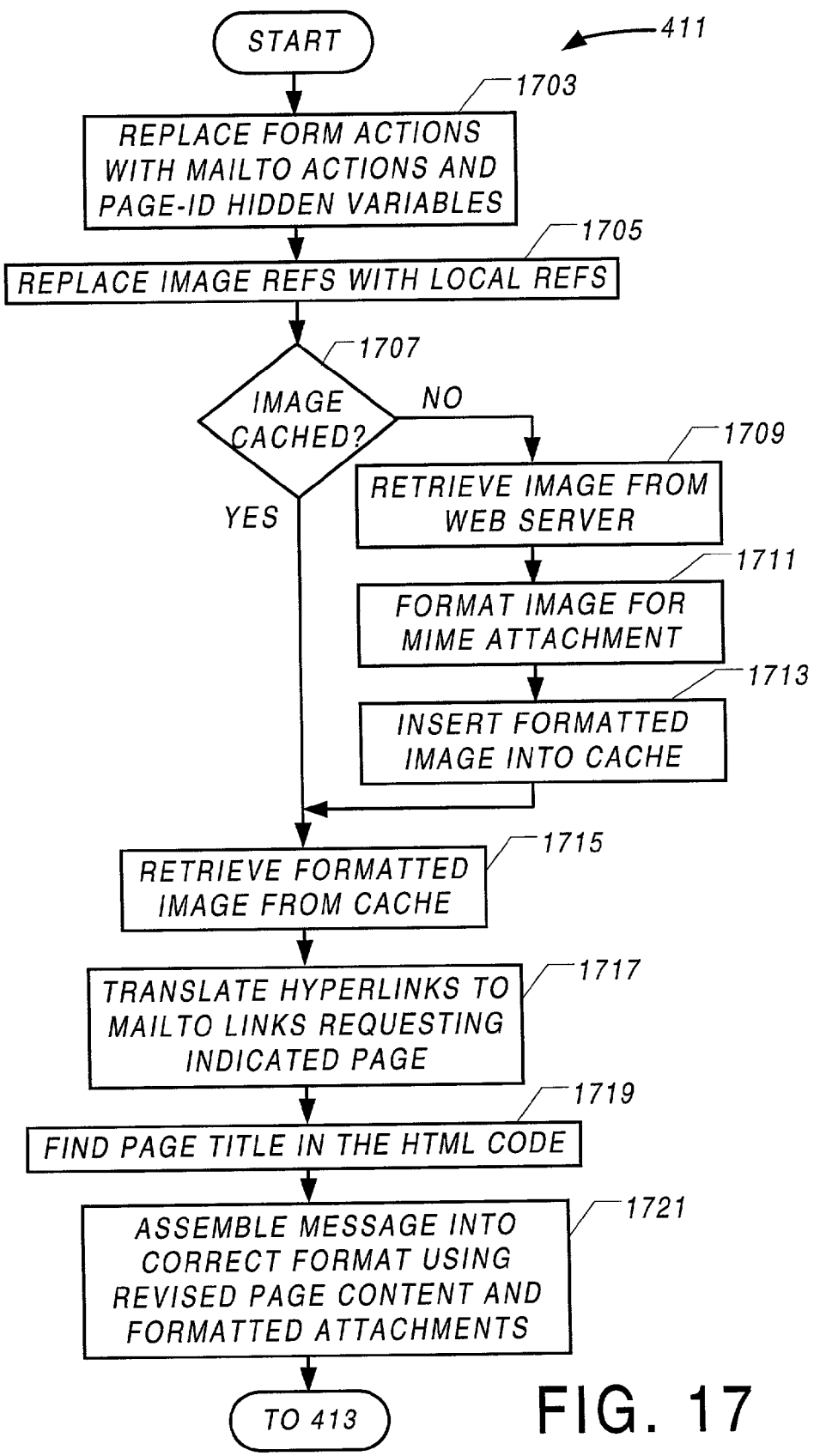
FIG. 17 is a flowchart schematically illustrating transcoding the resulting Web page, according to an embodiment of the present invention.

Referring now to FIG. 17, according to an embodiment of the present invention the steps required to for the process of transcoding a Web page for email delivery are schematically illustrated. This process, which is step 411 of FIG. 4, includes parsing and then modifying the HTML content received from the Web server in step 1513 and then constructing a complete email message for delivery to the email browser. The order of steps shown is that of one embodiment, and it is to be understood that one could relatively easily re-order these steps to create alternative embodiments.

In the embodiments detailed below and in other embodiments, whenever a URL (including but not limited to hyperlinks, image references, and form ACTION attribute values) is transcoded, if the original URL is a "relative" URL (meaning it is specified relative to some base URL, for example "../index. html"), then the transcoded URL is converted to a fully qualified absolute URL. The base URL relative to which the URL is converted is the URL originally specified to retrieve the Web page in which the relative URL appears, or an explicitly specified base URL contained in the HTML code, as the case may be.

First the system updates all "FORM" HTML tags with new attributes and adds hidden variables in the form data to represent the original attributes (step 1703). Specifically, the "ACTION" attribute, which is normally a "http:" URL, is changed to a "mailto:" URL such as "mailto: Webmail@bigbow.com." The original value of the "ACTION" attribute is placed in a new hidden form variable called REQUEST_URL within the form data, for example, <input type=hidden name=request_url value=http://www-.bigbow.com/action.cgi>

This value will be accessed during the next interaction cycle in steps 1019 and 1023.

Similarly, the "METHOD" attribute is changed to "POST," and the original value of the attribute is placed in a new hidden form variable called REQUEST_METHOD within the form data, for example <input type=hidden name=request_method value=POST>.

This value will be accessed during the next interaction cycle in steps 1025 and 1029. Note that alternate embodiments also are possible for transmitting these two pieces of information with the form, and any embodiment, which can communicate the information and is consistent with the methods used to implement step 405 (or step 305) are satisfactory to implement the present invention. Those skilled in the art will find it straightforward to modify the invention to use these other methods.

Next, all image references in the HTML document are replaced with local image references (step 1705). Image references may include image tags ("IMG") and the background attribute of other tags. Image references in an HTML document consist of a URL linking to the image on a Web server (whether local or not). This is also allowable in an HTML email message, and in some embodiments of the present invention the image references are left intact. In one embodiment, however, the images are transmitted with the message as attachments, allowing the images to be viewed in the email browser even if the user is not connected to the Internet. In other alternate embodiment, some or all images are not attached to the email nor are links activated for these images. Examples include when the images are larger than some threshold that might be selected by the user according to some criteria. For example, the email address to send to may indicate a particularly slow connection. For example, the address may indicate a mobile email connection such as those that use cellular telephones an acoustical coupler (e.g., PocketMail1υ from PocketScience, Inc., Santa Clara, Calif.). In such alternate embodiments, the links to images in the case of an HTML enabled email browser would simply be seen as a symbol indicating some missing reference.

Thus, in one embodiment, the references to the images are translated to "local" references (step 1705). For this, the images are attached to the message using the "multipart/related" MIME type, and include a unique identifier prefaced with "cid:". In one embodiment, the system constructs a unique identifier for each image reference by translating all the punctuation in the original URL (e.g., ":", "/", ".", "<", ">") to hyphens and then places "cid:" before the thus modified reference (i.e., prepends "cid:"). Those skilled in the art will appreciate that there are many other means of constructing unique identifiers and all such alternate embodiments are within the scope of the invention. In one embodiment these identifiers and the original URLs with which they are associated are stored in a memory array for later access.

In those embodiments and situations where images are attached to the email message, each image is retrieved from the Web server (step 1709) and encoded into text data (step 1711). In some embodiments these operations are performed directly as needed.

In one embodiment, referring again to FIG. 2, encoded images are stored in a cache 213 which, in this embodiment, is part of the RAM 205 on the system on which the proxy server is implemented (server system 107 of FIG. 2). In alternate embodiments, when the size of images is expected to be large, all or part of the cache may be in the mass storage 211 of system 107, and so FIG. 2 shows the cache 213 as having components in both RAM and mass storage. Referring back to FIG. 17, the cache stored images are identified in the cache with their original URL. The caching provides for improved performance and reduces the load on the Web server. For each image reference identified in step 1705, the system first determines whether the image is already available in the cache (step 1707). If not, the image is retrieved from the Web server (step 1709) using standard HTTP access.

Next it is encoded into text data so it may be included as a MIME attachment (step 1711). "Binary" data (where individual bytes take on all values ranging from 0 to 255) does not transmit well on the Internet because different computers and operating systems interpret these characters differently. As a result, all data in an email message is translated into readable characters such as a–z, A–Z, 0–9, and a few punctuation characters. Those skilled in the art are aware that there are many methods of encoding (and subsequently decoding) binary data into text data and that several standard methods, for example "uuencode" and "BASE64," are commonly available. In the present invention, any of these methods may be used as long as the email browser can decode the data. In one embodiment, the "BASE64" encoding is used. Once the image is properly encoded, it is stored in the cache along with its original URL (step 1713).

Note that steps 1707 and 1709–1713 are carried out for each image identified in step 1705. Thus, in one embodiment, steps 1707 and 1709–1713 are a loop of steps carried out for each image until there are no more images. How to modify the flowchart of FIG. 15 to so accommodate the loop would be clear to those of ordinary skill in the art. At this point, whether or not the image was originally stored in the cache, it is retrieved from the cache (step 1715) and, in one embodiment, it is stored in association with the memory array produced in step 1705 that contains the local image references and original image URLs. Those skilled in the art will find it straightforward to implement alternative embodiments where image references and data are processed in a different order, for example, by fully processing each image all the way through to attachment rather than by storing all of them.

Clicking on an HTTP hyperlink in an HTML email message will cause a Web browser to launch and access the indicated URL over the Internet. In some embodiments of the present invention, one or more of the hyperlinks are left intact for this purpose. In one embodiment, however, the system now translates all HTTP hyperlinks to "mailto" links (step 1717), allowing the indicated URLs to be accessed through email. This step is performed by finding all HTML "anchor" tags, and for each, substituting a new value for the "HREF" attribute. Specifically, the original HREF will contain a URL, and the new value will contain "mailto:" followed by the email address of the email proxy server, followed by "?subject=" followed by the original URL. For example, the URL "http://www.bigbow.com" would be translated as "mailto:Webmail@bigbow.com?subject=http://www.bigbow.com". Later in the interaction with the user, when the user views the resulting email message and clicks on this link, the link will cause an email message to be sent to the email proxy server 511 with the "Subject" field filled in with an appropriate URL in a manner similar to step 807, and this will, ultimately in the next cycle, result in the desired Web page being delivered to the user's email inbox.

In one embodiment, the system now finds the title of the Web page (the HTML "TITLE" tag) (step 1719). This will be used as the Subject field of the outbound email message. In other embodiments, other values could be used for the Subject field.

In one embodiment the outgoing email message is now assembled from the various items of data that has been accumulated (step 1721). In some alternate embodiments, the steps are re-ordered so that portions of the final message are constructed as soon as the data is available. In yet other embodiments, some of the steps are delayed even further. For example, the images could be translated while the message is built at the end rather than cached and stored. Those skilled in the art may easily modify the process to optimize the order of these operations for the specific application.

FIGS. 18A and 18B show the message 1800 that is now constructed as a standard MIME Internet email message (see RFC-1521 and RFC-1522 for a description of MIME). FIGS. 18A and 18B are now briefly described and described in more detail further below. In one embodiment, the headers are assembled first. The Content-Type header 1809 indicates that the message is of type "multipart/related" and specifies the "boundary" code 1811 used to separate each "part" of the message. The basic email delivery headers are also constructed, including the "To" header field 1803 (from the sendto_email field 1215 as retrieved in step 1309), the "From" header field 1805 (the email address of the email proxy server as configured), and "Subject" header field 1807 (determined in step 1719). Next, the first boundary 1815 is added, the content type 1817 (usually "Content-Type: text/html") and content id 1819 of the message body are indicated, and then the actual content 1821 as transcoded in steps 1703, 1705, and 1717 and as further illustrated in FIG. 19 is included.

After the content, each image is attached to the message. This begins with the image boundary code 1823. Moving now to FIG. 18B, a "Content Id" 1825 matching the unique identifier in the local image reference as produced in step 1705 follows, then the image content type 1827 (for example, image/jpeg), and the "Content-Transfer-Encoding" 1829 as used in step 1711-in the one embodiment, "BASE64." Following these headers for the attachment, the actual encoded image data 1831 is appended. Subsequent image attachments are included by beginning again with the image boundary code 1823.

A final boundary code 1833 is then added and the message is complete. In other embodiments, for example those in which images are not transmitted with the message and image references are not transcoded, the content type of the message may be "text/html" or some other content type, rather than "multipart/related." As those skilled in the art will appreciate, the specifics of the formatting of this message according to the MIME standard will depend on the details of the particular embodiment of the present invention that is implemented.

Referring now to FIG. 19A, the figure illustrates HTML 1900 for the various elements of a Web page that are to be transcoded according to an embodiment of the present invention. The page title 1903 is not modified but will be used later as the Subject header field of the email message. The background image 1905 is the image that will be displayed as the background of the Web page. Note that tags other than the "BODY" tag may have a BACKGROUND attribute and these too would be transcoded. The FORM tag 1907 indicates an HTML form that will be transcoded. The Action URL 1911 is the URL for the application program that would be executed if the form were submitted normally through a Web browser client. The Method 1915 is the HTTP command that would be used if the form were submitted normally through a Web browser client. The Image tag 1917 is a standard in-line image reference that will be transcoded. The Hyperlink 1919 is an example of an HTTP hyperlink that will be transcoded.

Referring now to FIG. 19B, the figure illustrates HTML 1920 for the various elements of a Web page that have been transcoded in relation to FIG. 19A and according to an embodiment of the present invention. The Action Mailto 1923 is the new value of the ACTION attribute for the form, and the Request URL 1927 shows where the original value of the Action URL 1911 is stored. Similarly, the transcoded Method 1925 is the new value of the METHOD attribute for the form, and the Request Method 1929 shows where the original value of the Method 1915 is stored. The transcoded image tags 1931 are the local image references relating to the background image 1905 and the Image tag 1917, and will correspond to the images that will be attached to the message. The transcoded hyperlink 1933 corresponds to the original Hyperlink 1919.

Figure 20:
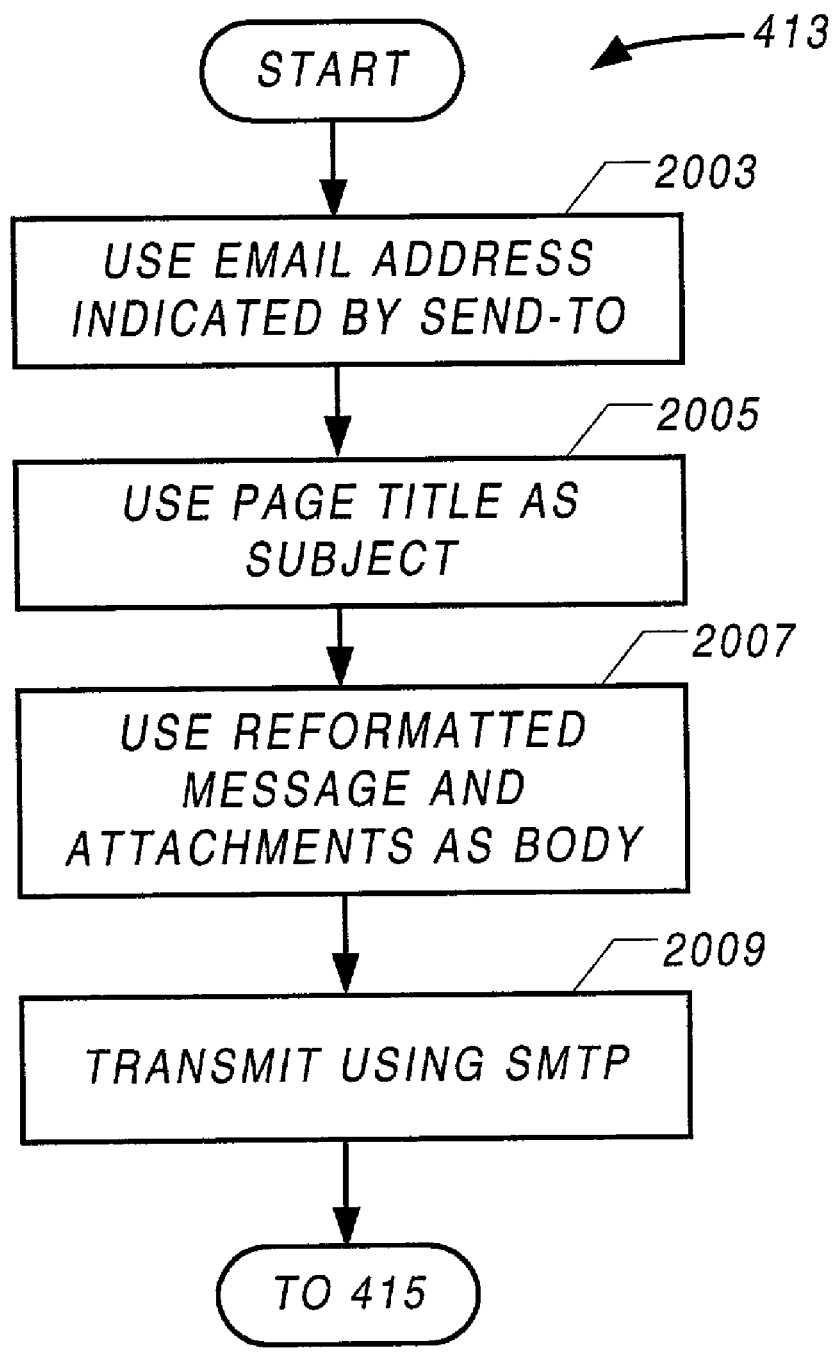
FIG. 20 is a flowchart schematically illustrating transmitting the Web page via email, according to an embodiment of the present invention.

Referring now to FIG. 20, the operations involved in transmitting the Web page via email, according to one embodiment of the present invention, are schematically illustrated. As is understood by those skilled in the art, code libraries are widely available for performing the actual transmission of an email message through SMTP. Such code is included, for example, in the Microsoft Visual Basic Developer's Toolkit. In one embodiment of the present invention, such a code library is used and therefore the process of transmitting the email message consists of simply instructing the code library to transmit the message as constructed in step 1721. In an alternate embodiment such as that illustrated, possibly using a different code library, the message would be constructed in step 1721 without the "To," and "Subject" headers and those values would be specified as part of the transmission. The delivery address is specified (step 2003) using the sendto_email field 1215 as retrieved in step 1309. The message subject is specified (step 2005) using the Web page title as determined in step 1719. The message body is specified (step 2007) as constructed in step 1721. Once these parameters are specified, the email message is transmitted using the code library (step 2009).

Referring again to FIGS. 18A and 18B, the various elements of an email message as constructed by an embodiment of the present invention in step 1721 are illustrated in exemplary fashion. Referring first to FIG. 18A, the "To" address 1803 is the address to which the email message will be delivered. The "From" address 1805 is the address of the email proxy server. The "Subject" field 1807 is the subject of the message as it will be displayed in the email browser.

The "message content type" 1809 indicates the MIME type of the overall message. For MIME types that are "multipart," email browser software will look for additional sections with their own MIME types. The "multipart/related" type, which is used in one embodiment, indicates not only that there are several sections but that the initial section may reference objects in subsequent sections. This is what allows local image references to access the attached images. For a "multipart" message, a "boundary code" 1811 is specified to allow software to recognize when one section is ending and 5 another is beginning. Any boundary code that does not otherwise appear in the content of any section is allowable. The MIME notice 1813 is included as the content of the message header and is not used functionally. The beginning of the first "part" is now indicated by two hyphens followed by an instance 1815 of the boundary code 1811. In one embodiment, this first part of the "multipart" message is the body of the email message and will be interpreted as such by HTML email browsers. As a result, the body content type 1817 is illustrated as "text/html." The body content id 1819 specifies the unique identifier for the body of the message. The message body 1821 as transcoded is illustrated in greater detail in FIG. 19.

The body of the message ends and the first image begins with two hyphens and another instance of the boundary code 1811, the image boundary 1823. Referring now to FIG. 18B, the image boundary 1823 is followed by the image content id 1825, which is a unique identifier used to reference this "part" of the message in other parts, for example, in the body of the message as image references. Next the image content type 1827 is indicated; in the illustration this is "image/jpeg" although it could be any image data type understood by both the Web server and the email browser. Next the image encoding type 1829 is specified; as illustrated and as used in one embodiment, this is "BASE64," but in alternate embodiments other encoding schemes could be used. Following these headers and a blank line is the encoded image data 1831. Other images may be included at this point, and at the very end of the message, a final boundary 1833 is included.

Implementation of Embodiments of the Invention on a Processing System

A data processing system such as server system 107 (FIGS. 1 and 2) also may include application programs, operating systems, data, etc., which are not shown in FIG. 2 for the sake of clarity. It also will be understood that such a data processing system may also include numerous elements not shown, such as disk drives, keyboards, display devices, network connections, additional memory, additional CPUs, LANs, input/output lines, etc. For example, the server system 107 may actually include multiple physical and logical devices connected in a distributed architecture. Accordingly, the network interface card 217 is used to provide data communication with other devices that are part of server system 107.

As will be appreciated by those skilled in the art, embodiments of the present invention may be embodied as a method, an apparatus such as a data processing system, or a carrier medium, e.g., a computer program product. Accordingly, the present invention may take the form of an entirely hardware embodiment, an entirely software embodiment or an embodiment combining software and hardware aspects. Furthermore, the present invention may take the form of carrier medium (e.g., a computer program product) on a computer-readable storage medium having computer-readable program code embodied in the medium. Any suitable computer readable medium may be used including a magnetic storage device such as a diskette or a hard disk, or an optical storage device such as a CD-ROM.

It will be understood that the steps of methods and flowcharts discussed are performed in one embodiment by an appropriate processor such as processor 203 of the processing system shown as server system 107 executing instructions (code segments) stored in storage 211. It will also be understood that the invention is not limited to any particular implementation or programming technique and that the invention may be implemented using any appropriate techniques for implementing the functionality described herein. The invention is not limited to any particular programming language or operating system.

The instructions (computer readable code segments) in storage 211 may be read into RAM 205. Execution of sequences of instructions contained in storage 205 causes processor 203 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to a processor such as processor 203 for execution. Such a medium may take many forms, including but not limited to, non-volatile media, volatile media, and transmission media. Non-volatile media includes, for example, optical or magnetic disks, such as a storage device that is part of mass storage 211. Volatile media includes dynamic memory such as RAM 205. Transmission media include coaxial cables, copper wire and fiber optics, including the wires that comprise a bus within a computer, such as bus 221. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Although an implementation of the present invention can be used with an email browser that does not display HTML (for example, older versions of Eudora and Eudora Pro, or the Pine email reader for UNIX), in some cases the capabilities are more limited. Specifically, it can be used to request a URL from the Web server 507, and the resulting Web page will be delivered to the email browser as an attachment. The Web page can then be viewed by launching the attachment through a Web browser, or by saving the attachment to a file and opening it with a Web browser. In some circumstances the email browser will be capable of accepting "form post" operations that occur through the Web browser client, and in these circumstances the full capabilities of the invention are available with the assistance of the Web browser client. In these cases and others, one embodiment as detailed herein accommodates this type of usage. However, alternate embodiments within the scope of the invention, including but not limited to the use of different MIME types and a modified procedure for transcoding the Web page for email, may provide improved capabilities with some such email browser and Web browser combinations.

Therefore, although the present invention has been described in terms of the presently preferred embodiments, it is to be understood that the disclosure is not to be interpreted as limiting. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

What is claimed is:

1. A method of operating one or more Web pages by email, the method comprising the steps of:
sending a first Web page in a first email message to a first email address via a computer network, the first Web page including one or more of links or forms that provide for further interaction, the first Web page in a first format consistent with one or more properties of a first email environment such that the first Web page is directly operable in an instance of an email browser of the first email environment;
retrieving a second email message sent to a second email address via the computer network, the second email message including a URL request or form data, and generated as a result of a user directly operating the first Web page in an instance of the email browser of the first email environment;
interpreting the URL request or form data of the retrieved second email message;
retrieving a second Web page from a Web server connected to the computer network in accordance with the interpreted URL request or form data, the second Web page in a second format, the second format being a Web browser format;
transcoding the retrieved second Web page from the second format to a third format consistent with one or more properties of a second email environment, such that the transcoded second Web page is directly operable in an instance of the email browser of the second email environment; and
transmitting the transcoded second Web page to a third email address as a third email message.

2. A method as described in claim 1, further including:
transcoding an original Web page in a Web-browser format to the first format to generate the first Web page.

3. A method as described in claim 1, wherein the sending occurs when a calendar event occurs.

4. A method as described in claim 1, wherein the sending includes sending the first Web page to one or more other email addresses.

5. A method as described in claim 4, wherein the First and other email addresses to which the first Web page is sent are those email addresses that meet one or more targeting criteria.

6. A method as described in claim 1, wherein the sending includes sending a personalized version of the first Web page to one or more other email addresses.

7. A method as described in claim 6, wherein the first and other email addresses to which the first Web page is sent are those email addresses that meet one or more targeting criteria.

8. A method as described in claim 1, further including:
transcoding an original Web page in a Web-browser format to the first format to generate the first Web page, the transcoding the original Web page including introducing none or more form tags and variables,
wherein the interpreting includes interpreting any specialized form tags and variables introduced by any transcoding of the original Web page.

9. A method as described in claim 1 wherein the interpreting includes email-browser specific translating.

10. A method as described in claim 1 wherein the interpreting includes determining the type of email-browser.

11. A method as described in claim 1, wherein the second Web page includes one or more hyperlinks or a second set of form data, wherein the transcoding step includes, in the case that the retrieved Web page includes one or more hyperlinks, the step of:

converting one or more hyperlinks in the retrieved second Web page to one or more corresponding links in the transcoded second Web page, such that each corresponding link is directly operable in the instance of the email browser of the second email environment, and such that operating a corresponding link in the email browser instance causes a further email message containing the URL request of the corresponding hyperlink to be sent to a fifth email address via the computer network; and wherein the transcoding step includes, in the case that the retrieved Web page includes a second set of form data, the step of;

converting one or more form controls in the second set of form data such that each converted form control is directly operable in the instance of the email browser of the second email environment, and such that operating a converted form control in the email browser instance causes a further email message to be sent to a fifth email address via the computer network.

12. A method according to claim 11, wherein the transcoding step further includes, in the case that the retrieved second Web page includes a relative URL, converting the relative URL to an absolute URL.

13. A method according to claim 11, wherein, in the case that the retrieved second Web page includes one or more hyperlinks, the corresponding link is a "mailto;" URL.

14. A method according to claim 11, wherein, in the case that the retrieved second Web page includes one or more hyperlinks, at least one hyperlink in the retrieved second Web page is left intact such that a user clicking on the intact hyperlink in an instance of an email browser of the second email environment would cause a Web browser to launch and the URL of the clicked hyperlink to be retrieved via the computer network.

15. A method according to claim 11, wherein, in the case that the retrieved second Web page includes one or more form controls that have associated URLs, converting the form controls to mailto references, such that clicking on the form controls in an instance of an email browser of the second email environment would cause a further email message containing the form with any filled-in data to be sent to a fourth email address via the computer network.

16. A method according to claim 11, wherein the transcoding step further includes, in the case that the retrieved second Web page includes one or more image references, retrieving the images of the image references and transmitting the retrieved images with the transcoded second Web page to the third email address.

17. A method according to claim 11, wherein the transcoding step further includes, in the case that the retrieved second Web page includes one or more image references, retrieving the images is from a cache containing the images in the case that the images are stored in the cache.

18. A method according to claim 16, wherein the retrieved images are transmitted as attachments to the third email message.

19. A method according to claim 16, wherein the transcoding step further includes replacing the image references with local image references.

20. A method as described in claim 1, wherein the retrieving of the second Web page occurs according to a priority.

21. A method as described in claim 20, further comprising:

inserting a request for the second Web page into a queue; and retrieving the request for the second Web page from the queue in priority order, such that the retrieving of the second Web page is per the retrieved request.

22. A method as described in claim 21, wherein the retrieving of the request for the second Web page from the queue includes marking the queue entry to prevent any other access to the same queue entry, the method further including marking the queue entry to allow other accesses to the queue entry once retrieval of the second Web page is complete.

23. A method as described in claim 1, wherein the third format includes one or more properties in accordance with the URL request or form data.

24. A method as described in claim 1, wherein the transmitting of the transcoded second Web page is in accordance to the URL request to form data.

25. A method of operating a Web server in communication with a computer network, the Web server to provide one or more Web pages, the method comprising the steps of:

retrieving a first email message sent to a first email address via the computer network, the email message containing a URL request or form data;

interpreting the retrieved first email message URL request or form data;

retrieving a first Web page from the Web server in accordance with the interpreted URL request or form data, the first Web page including one or more of links or forms and in a first format, the first format being a Web browser format;

transcoding the retrieved first Web page from the Web browser format to a second format consistent with one or more properties of a first email environment, such that the transcoded first Web page is directly operable in an instance of an email browser of the first email environment; and transmitting the transcoded first Web page to a second email address.

26. A method as described in claim 25, wherein the transcoding step includes, in the case that the retrieved Web page includes one or more hyperlinks, the step of:

converting one or more hyperlinks in the retrieved first Web page to one or more corresponding links in the transcoded first Web page; such that each corresponding link is directly operable in the instance of the email browser of the first email environment, and such that operating a corresponding link in the email browser instance causes a further email message containing the URL request of the corresponding hyperlink to be sent to a third email address via the computer network; and wherein the transcoding step includes, in the case that the retrieved Web page includes a second set of form data, the step of;

converting one or more form controls in the second set of form data such that each converted form control is directly operable in the instance of the email browser of the first email environment, and such that operating a converted form control in the email browser instance causes a further email message to be sent to a third email address via the computer network.

27. A method according to claim 25, wherein the transcoding step further includes, in the case that the retrieved first Web page includes a relative URL, converting the relative URL to an absolute URL.

28. A method according to claim 26, wherein, in the case that the retrieved first Web page includes one or more hyperlinks, the corresponding link is a "mailto" reference.

29. A method according to claim 26, wherein, in the case that the retrieved first Web page includes one or more hyperlinks, at least one hyperlink in the retrieved first Web page is left intact such that a user clicking on the intact hyperlink in an instance of an email browser of the first email environment would cause a Web browser to launch and the URL of the clicked hyperlink to be retrieved via the computer network.

30. A method according to claim 26, wherein, in the case that the retrieved Web page includes one or more form controls that have associated URLs, converting the form controls to mailto references, such that clicking on the form controls in an instance of an email browser of the first email environment would cause a further email message containing the form with any filled-in data to be sent to a third email address via the computer network.

31. A method according to claim 25, wherein the transcoding step further includes, in the case that the retrieved first Web page includes one or more image references, retrieving the images of the image references and transmitting the retrieved images with the transcoded first Web page to the second email address.

32. A method according to claim 25, wherein the transcoding step further includes, in the case that the retrieved first Web page includes one or more image references, retrieving the images is from a cache containing the images in the case that the images are stored in the cache.

33. A method according to claim 31, wherein the retrieved images are transmitted as attachments to the second email message.

34. A method according to claim 31, wherein the transcoding step further includes replacing the image references with local image references.

35. A method as described in claim 25, wherein the retrieving of the first Web page occurs according to a priority.

36. A method as described in claim 35, further comprising:
 inserting a request for the first Web page into a queue; and
 retrieving the request for the first Web page from the queue in priority order,
such that the retrieving of the first Web page is per the retrieved request.

37. A method as described in claim 36, wherein the retrieving of the request for the first Web page from the queue includes marking the queue entry to prevent any other access to the same queue entry, the method further including marking the queue entry to allow other accesses to the queue entry once retrieval of the first Web page is complete.

38. A method as described in claim 25, wherein the third format includes one or more properties in accordance with the URL request or form data.

39. A method as described in claim 25, wherein the first email message is formed by transcoding an original Web page, wherein the transcoding the original Web page includes introducing none or more form tags and metavariables, and wherein the interpreting includes interpreting any specialized form tags and variable (metavariables) introduced by any transcoding of the original Web page.

40. A method as described in claim 25, wherein the interpreting includes email-browser specific translating.

41. A method as described in claim 25, wherein the interpreting includes determining the type of email-browser.

42. A carrier medium carrying one or more computer readable code segments for controlling a processing system to carry out a method of operating one or more Web pages by email, comprising:
 computer readable code to effect one or more processors of the processing system to send a first Web page in a first email message to a first email address via a computer network, the first Web page including one or more of links or forms that provide for further interaction, the Web page in a first format consistent with one or more properties of a first email environment such that the first Web page is directly operable in an email browser of the first email environment;
 computer readable code to effect one or more processors of the processing system to retrieve a second email message sent to a second email address via the computer network, the second email message including a URL request or form data, and generated as a result of a user directly operating the first Web page in an instance of the email browser of the first email environment;
 computer readable code to effect one or more processors of the processing system to interpret the URL request or form data of the retrieved second email message;
 computer readable code to effect one or more processors of the processing system to retrieve a second Web page from a Web server connected to the computer network in accordance with the interpreted URL request or form data, the second Web page in a Web browser format;
 computer readable code to effect one or more processors of the processing system to transcode the retrieved second Web page from the Web browser format to a third format consistent with one or more properties of a second email environment, such that the transcoded second Web page is directly operable in an instance of the email browser of the second email environment; and
 computer readable code to effect one or more processors of the processing system to transmit the transcoded second Web page to a third email address as a third email message.

43. A carrier medium as described in claim 42, further comprising:
 computer readable code to effect one or more processors of the processing system to transcode an original Web page in a Web-browser format to the first format to generate the first Web page.

44. A carrier medium as described in claim 42, wherein the sending occurs when a calendar event occurs.

45. A carrier medium as described in claim 42, wherein the code to effect sending includes code to effect sending the first Web page to one or more other email addresses.

46. A carrier medium as described in claim 45, wherein the first and other email addresses to which the first Web page is sent are those email addresses that meet one or more targeting criteria.

47. A carrier medium as described in claim 42, wherein the code to effect sending includes code to effect sending a personalized version of the first Web page to one or more other email addresses.

48. A carrier medium as described in claim 47, wherein the first and other email addresses to which the first Web page is sent are those email addresses that meet one or more targeting criteria.

49. A carrier medium as described in claim 42, further including
computer readable code to effect one or more processors of the processing system to transcode an original Web page in a Web-browser format to the first format to generate the first Web page, the transcoding the original Web page including introducing none or more form tags and variables,
wherein the interpreting includes interpreting any specialized form tags and variables introduced by any transcoding of the original Web page.

50. A carrier medium as described in claim 42 wherein the interpreting includes email-browser specific translating.

51. A carrier medium as described in claim 42, wherein the second Web page includes one or more hyperlinks or a second set of form data,
wherein the code to effect transcoding includes, in the case that the retrieved Web page includes one or more hyperlinks:
computer readable code to effect one or more processors of the processing system to convert one or more hyperlinks in the retrieved second Web page to one or more corresponding links in the transcoded second Web page, such that each corresponding link is directly operable in the instance of the email browser of the second email environment, and such that operating a corresponding link in the email browser instance causes a further email message containing the URL request of the corresponding hyperlink to be sent to a fourth email address via the computer network; and
wherein the code to effect transcoding step includes, in the case that the retrieved Web page includes a second set of form data:
computer readable code to effect one or more processors of the processing system to convert one or more form controls in the second set of form data such that each converted form control is directly operable in the instance of the email browser of the second email environment, and such that operating a converted form control in the email browser instance causes a further email message to be sent to a fourth email address via the computer network.

52. A carrier medium according to claim 51, wherein the code to effect transcoding further includes, in the case that the retrieved second Web page includes a relative URL, computer readable code to effect one or more processors of the processing system to convert the relative URL to an absolute URL.

53. A carrier medium according to claim 51, wherein, in the case that the retrieved second Web page includes one or more hyperlinks, the corresponding link is a "mailto" reference.

54. A carrier medium according to claim 51, wherein, in the case that the retrieved second Web page includes one or more hyperlinks, at least one hyperlink in the retrieved second Web page is left intact such that a user clicking on the intact hyperlink in an instance of an email browser of the second email environment would cause a Web browser to launch and the URL of the clicked hyperlink to be retrieved via the computer network.

55. A carrier medium according to claim 51, wherein, in the case that the retrieved second Web page includes one or more form controls that have associated URLs, the code to effect converting includes computer readable code to effect one or more processors of the processing system to convert the form controls to mailto references, such that clicking on the form controls in an instance of an email browser of the second email environment would cause a further email message containing the form with any filled-in data to be sent to a fourth email address via the computer network.

56. A carrier medium according to claim 51, wherein the code to effect transcoding further includes, in the case that the retrieved second Web page includes one or more image references, computer readable code to effect one or more processors of the processing system to retrieve the images of the image references and transmitting the retrieved images with the transcoded second Web page to the third email address.

57. A carrier medium according to claim 51, wherein the code to effect transcoding further includes, in the case that the retrieved second Web page includes one or more image references and that the images are stored in a cache, computer readable code to effect one or more processors of the processing system to retrieve the images from the cache.

58. A carrier medium according to claim 56, wherein the retrieved images are transmitted as attachments to the third email message.

59. A carrier medium according to claim 56, wherein the code to effect transcoding step further includes computer readable code to effect one or more processors of the processing system to replace the image references with local image references.

60. A carrier medium as described in claim 42, wherein the retrieving of the second Web page occurs according to a priority.

61. A carrier medium as described in claim 42, wherein the third format includes one or more properties in accordance with the URL request or form data.

62. A carrier medium as described in claim 42, wherein the transmitting of the transcoded second Web page is in accordance to the URL request to form data.

63. A carrier medium carrying one or more computer readable code segments for controlling a processing system that includes one or more processors to carry out a method of operating a Web server in communication with a computer network, the Web server to provide one or more Web pages, comprising:
computer readable code to effect one or more processors of the processing system to retrieve a first email message sent to a first email address via the computer network, the email message containing a URL request or form data;
computer readable code to effect one or more processors of the processing system to interpret the retrieved first email message URL request or form data;
computer readable code to effect one or more processors of the processing system to retrieve a first Web page from the Web server in accordance with the interpreted URL request or form data, the first Web page including one or more of links or forms and in a first format, the first format being a Web browser format;
computer readable code to effect one or more processors of the processing system to transcode the retrieved first Web page from the Web browser format to a second format consistent with one or more properties of a first email environment, such that the transcoded first Web page is directly operable in an instance of an email browser of the first email environment; and
computer readable code to effect one or more processors of the processing system to transmit the transcoded first Web page to a second email address.

64. A carrier medium as described in claim 63,
wherein the code to effect transcoding includes, in the case that the retrieved Web page includes one or more hyperlinks:
   computer readable code to effect one or more processors of the processing system to convert one or more hyperlinks in the retrieved first Web page to one or more corresponding links in the transcoded first Web page, such that each corresponding link is directly operable in the instance of the email browser of the first email environment, and such that operating a corresponding link in the email browser instance causes a further email message containing the URL request of the corresponding hyperlink to be sent to a third email address via the computer network; and
wherein the code to effect transcoding includes, in the case that the retrieved Web page includes a second set of form data:
   computer readable code to effect one or more processors of the processing system to convert one or more form controls in the second set of form data such that each converted form control is directly operable in the instance of the email browser of the first email environment, and such that operating a converted form control in the email browser instance causes a further email message to be sent to a third email address via the computer network.

65. A carrier medium according to claim 63, wherein the code to effect transcoding further includes, in the case that the retrieved first Web page includes a relative URL, computer readable code to effect one or more processors of the processing system to convert the relative URL to an absolute URL.

66. A carrier medium according to claim 64, wherein, in the case that the retrieved first Web page includes one or more hyperlinks, the corresponding link is a "mailto" reference.

67. A carrier medium according to claim 64, wherein, in the case that the retrieved first Web page includes one or more hyperlinks, at least one hyperlink in the retrieved first Web page is left intact such that a user clicking on the intact hyperlink in an instance of an email browser of the first email environment would cause a Web browser to launch and the URL of the clicked hyperlink to be retrieved via the computer network.

68. A carrier medium according to claim 64, wherein, in the case that the retrieved Web page includes one or more form controls that have associated URLs, the code to effect transcoding includes computer readable code to effect one or more processors of the processing system to convert the form controls to mailto references, such that clicking on the form controls in an instance of an email browser of the first email environment would cause a further email message containing the form with any filled-in data to be sent to a third email address via the computer network.

69. A carrier medium according to claim 63, wherein the code to effect transcoding includes, in the case that the retrieved first Web page includes one or more image references, computer readable code to effect one or more processors of the processing system to retrieve the images of the image references and transmitting the retrieved images with the transcoded first Web page to the second email address.

70. A carrier medium according to claim 63, wherein the code to effect transcoding includes, in the case that the retrieved first Web page includes one or more image references and that the images are stored in a cache, computer readable code to effect one or more processors of the processing system to retrieve the images from the cache.

71. A carrier medium according to claim 69, wherein the retrieved images are transmitted as attachments to the second email message.

72. A carrier medium according to claim 69, wherein the code to effect transcoding further includes computer readable code to effect one or more processors of the processing system to replace the image references with local image references.

73. A carrier medium as described in claim 63, wherein the retrieving of the first Web page occurs according to a priority.

74. A carrier medium as described in claim 63, wherein the third format includes one or more properties in accordance with the URL request or form data.

75. A carrier medium as described in claim 63, wherein the first email message is formed by transcoding an original Web page, wherein the transcoding the original Web page includes introducing none or more form tags and metavariables, and wherein the code to effect interpreting includes computer readable code to effect one or more processors of the processing system to interpret any specialized form tags and variable (metavariables) introduced by any transcoding of the original Web page.

76. A carrier medium as described in claim 63, wherein the code to effect interpreting includes computer readable code to effect one or more processors of the processing system to perform email-browser specific translating.

77. An apparatus for operating one or more Web pages by email, the apparatus comprising the steps of:
   means for sending a first Web page to a first email address via a computer network, the first Web page including one or more of links or forms that provide for further interaction, the first Web page in a first format consistent with one or more properties of a first email environment such that the first Web page is directly operable in an email browser of the first email environment;
   means for retrieving a first email message sent to a second email address via the computer network, the second email message including a URL request or form data, and generated as a result of a user directly operating the first Web page in an instance of the email browser of the first email environment;
   means for interpreting the URL request or form data of the retrieved second email message;
   means for retrieving a second Web page from a Web server connected to the computer network in accordance with the interpreted URL request or form data, the second Web page in a second format, the second format being a Web browser format;
   means for transcoding the retrieved second Web page from the second format to a third format consistent with one or more properties of a second email environment, such that the transcoded second Web page is directly operable in an instance of the email browser of the second email environment; and
   means for transmitting the transcoded second Web page to a third email address as a third email message.

78. An apparatus for operating a Web server in communication with a computer network, the Web server to provide one or more Web pages, comprising:
   means coupled to the computer network for retrieving a first email message sent to a first email address via the computer network, the email message containing a URL request or form data;

means coupled to the email retrieving means, for interpreting the retrieved first email message URL request or form data;

means coupled the computer network for retrieving a first Web page from the Web server in accordance with the interpreted URL request or form data, the first Web page including one or more of links or forms and in a first format, the first format being a Web browser format;

means coupled to the Web page retrieving means, for transcoding the retrieved first Web page from the Web browser format to a second format consistent with one or more properties of a first email environment, such that the transcoded first Web page is directly operable in an instance of an email browser of the first email environment; and means coupled to the computer network and to the transcoding means, for transmitting the transcoded first Web page to a second email address.

\* \* \* \* \*